US012593826B2

(12) United States Patent     (10) Patent No.:     US 12,593,826 B2
Iwashita                          (45) Date of Patent:        Apr. 7, 2026

(54) LEASH FOR PET

(71) Applicant: Yoshitaka Iwashita, Kasugai (JP)

(72) Inventor:  Yoshitaka Iwashita, Kasugai (JP)

( * ) Notice:   Subject to any disclaimer, the term of this patent is extended or adjusted under 35 U.S.C. 154(b) by 0 days.

(21) Appl. No.: 18/769,388

(22) Filed:     Jul. 11, 2024

(65)           Prior Publication Data

US 2026/0013472 A1     Jan. 15, 2026

(51) Int. Cl.
*A01K 27/00*          (2006.01)

(52) U.S. Cl.
CPC ................................... *A01K 27/003* (2013.01)

(58) Field of Classification Search
CPC .... A01K 27/001; A01K 27/003; E05B 75/00;
A61F 5/3723
See application file for complete search history.

(56)           References Cited

U.S. PATENT DOCUMENTS

| | | | | | |
|---|---|---|---|---|---|
| 770,070 | A | * | 9/1904 | Johnson | ................ A01K 27/001 |
| | | | | | 119/864 |
| 2,458,489 | A | * | 1/1949 | Hallander | ............ A01K 27/001 |
| | | | | | 119/793 |
| 4,638,764 | A | * | 1/1987 | Anderson | .............. A01K 27/00 |
| | | | | | 119/770 |
| 4,841,915 | A | * | 6/1989 | Rocchetti | ............. A01K 27/001 |
| | | | | | 119/864 |
| 5,088,272 | A | * | 2/1992 | Anderson | .............. A01K 25/00 |
| | | | | | 54/24 |
| 5,317,989 | A | * | 6/1994 | Swanson | .............. A01K 27/001 |
| | | | | | 119/793 |

| | | | | | |
|---|---|---|---|---|---|
| 5,383,426 | A | * | 1/1995 | Krauss | ................. A01K 27/003 |
| | | | | | 119/793 |
| 6,553,944 | B1 | * | 4/2003 | Allen | ................... A01K 27/003 |
| | | | | | 119/770 |
| 6,725,865 | B2 | * | 4/2004 | Chapman | ................ E05B 75/00 |
| | | | | | 128/869 |
| 7,243,615 | B1 | * | 7/2007 | Hendrie | ............... A01K 27/001 |
| | | | | | 119/863 |
| 8,833,310 | B2 | * | 9/2014 | Konigsberg | ......... A01K 27/004 |
| | | | | | 119/796 |
| 9,902,590 | B2 | * | 2/2018 | Dufek | .................. B65H 75/446 |
| 11,246,295 | B2 | * | 2/2022 | Robinson | ............. A01K 27/002 |
| 11,291,187 | B2 | * | 4/2022 | Vesely | ................. A01K 27/002 |

(Continued)

FOREIGN PATENT DOCUMENTS

| | | | | | |
|---|---|---|---|---|---|
| CA | 2932281 | C | * | 8/2018 | ......... A63B 21/4035 |
| CN | 202819269 | U | * | 3/2013 | ............. A01K 25/00 |

(Continued)

*Primary Examiner* — Magdalena Topolski

(74) *Attorney, Agent, or Firm* — Yokoi & Co., U.S.A.; Toshiyuki Yokoi

(57)           ABSTRACT

A leash including: a rope having a shape of two or more rings at an end to be grasped by the owner; and a structure including a through hole into which a part of the rope is inserted for keeping a part of the two or more rings, where one end to the other end of the two or more rings are continuously connected, each of the two or more rings of the rope has the part inserted into the through hole, an inside size of a ring formed by the structure and a freely movable portion of one of the two or more rings of the rope not inserted into the through hole of the structure can be reduced by pulling the rope from another end to be connected to the pet, and the inside size can be enlarged by loosening the rope.

7 Claims, 24 Drawing Sheets

(56)  References Cited

U.S. PATENT DOCUMENTS

| | | | | |
|---|---|---|---|---|
| 11,484,010 | B2 * | 11/2022 | Holt, Jr. .................. | A01K 15/02 |
| 11,660,488 | B2 * | 5/2023 | d'Anconia ......... | A63B 21/0442 |
| | | | | 482/126 |
| 2006/0236954 | A1 * | 10/2006 | Abinanti .............. | A01K 27/002 |
| | | | | 119/792 |
| 2012/0060770 | A1 * | 3/2012 | Broock ................ | A01K 27/001 |
| | | | | 119/864 |
| 2013/0074782 | A1 * | 3/2013 | Marran ................ | A01K 27/001 |
| | | | | 119/793 |
| 2024/0057560 | A1 * | 2/2024 | Kuhnsman ........... | A01K 27/001 |

FOREIGN PATENT DOCUMENTS

| | | | | | |
|---|---|---|---|---|---|
| DE | 202013001465 | U1 * | 4/2013 | ........... | A01K 27/001 |
| DE | 202024000537 | U1 * | 7/2024 | ........... | A01K 15/027 |
| GB | 2416288 | A * | 1/2006 | ............. | A01K 25/00 |
| GB | 2603529 | A * | 8/2022 | ............. | A01K 15/02 |
| JP | 3137299 | U | 11/2007 | | |
| JP | 2012-80794 | A | 4/2012 | | |
| JP | 2013-70691 | A | 4/2013 | | |
| JP | 2023155103 | A * | 10/2023 | | |
| KR | 20070004476 | A * | 1/2007 | | |

* cited by examiner

LEASH FOR PET

TECHNICAL FIELD

The present invention relates to a leash (lead) used for walking a pet.

BACKGROUND OF THE INVENTION

It is convenient if an owner of the pet can use both hands immediately and freely during the walking of the pet when disposing excrement, giving water to the pet using a water bottle, or performing the other operations. However, when a generally known leash grasped by hands is used, it is necessary to perform the operations while grasping the leash by one hand. In the above described situation, if the pet suddenly moves or riots for some reason, the owner may not continue the operations. In the worst case, the possibility of the detachment of the leash from the hand increases. It is possible to tighten the leash to a certain place for using both hands freely for the operations. However, a good place convenient for tightening the leash cannot be always found in the actual walking. Even if the good place is found, a lot of effort and time are needed when the operations are performed after the leash is tightened.

As an example of the leash capable of making both hands of the owner freely for performing the operations, a leash which can be wound around a body of the owner during the walking is proposed (Patent document 1). However, when the pet moves suddenly for some reason during the operations with both hands, it is required to grasp the leash separated from a hand with the hand and pull the leash to restrict the movement of the pet. Thus, it is difficult to restrict the movement of the pet immediately and a time is required before restricting the movement of the pet. In addition, since the leash is wound around the body, time and labor are required for attaching and detaching the leash.

Furthermore, a structure of tightening the leash to the wrist and the length of the rope wound around the wrist is adjusted by hand to tighten and adhere the rope to the wrist without a gap is proposed (Patent document 2). In the above described structure, since a gap is not provided between the rope and the wrist, the possibility of preventing the leash from being easily removed from the wrist is high when the pet moves suddenly. However, when the pet moves and pulls the rope strongly in a state that the adhesion between the rope and the wrist is weak, the rope wound around the wrist may be rotated around the wrist while rubbing against the wrist depending on the direction of pulling the rope by the pet. Thus, there is a possibility of the injury of the wrist. On the contrary, when the adhesion between the rope and the wrist is strong, the possibility of the rotation of the rope around the wrist while rubbing against the wrist is initially decreased. However, since the force of pulling the rope by the pet is received at the portion where the length of the rope is adjusted and tightened, the tightened state of the rope is loosened at the portion where the length of the rope is adjusted and tightened. As a result, the rope wound around the wrist is rotated while rubbing against the wrist. Thus, the possibility of the injury of the wrist increases. When the gap between the wrist and the rope is further increased, the possibility of the detachment of the leash from the wrist also increases.

In order to reduce the possibility of the looseness of the tightened state of the rope at the portion where the length of the rope is adjusted and tightened, it is effective to use a lock mechanism or a hook and loop fastener to certainly keep the state that the length of the rope is adjusted. However, time and labor are required for fixing the leash certainly when the leash is attached in the above described method. In addition, if the adjustment of the length of the rope and the fixture of the rope are insufficient and a gap is formed between the wrist and the rope, the components such as the rope wound around the wrist may be rotated while rubbing against the wrist. Thus, the possibility of the injury of the wrist increases. In some cases, the possibility of the detachment of the leash from the wrist increases.

Furthermore, a leash formed by a belt provided with a metal hook having a special shape is proposed where the belt is wound around a body or a wrist and the length of winding the belt can be adjusted relatively easily and the adjusted state can be maintained (Patent document 3). In the above described structure, even when the pet moves and pulls the leash, the possibility of the deviation of the length of winding the belt can be kept low. Thus, the effect of preventing the belt from tightening the wrist too tightly can be expected.

Although the length can be adjusted easily to a certain degree in the above described structure, time and labor are required for adjusting the length of winding the belt by the position of the metal hook in accordance with the shape and the thickness of the wrist when attaching the leash. Depending on the adjustment state of the position of the metal hook, a gap is formed between the belt and the wrist, the belt is rotated while rubbing against the wrist and the possibility of the injury of the wrist increases. In some cases, the possibility of detachment of the belt from the wrist increases. Therefore, when attaching the belt to the wrist, it is necessary to take care of the adjustment position of the metal hook each time when the belt is attached. As a result, time and labor are required.

PRIOR ART DOCUMENT

Patent Document

[Patent document 1] Japanese Utility Model Registration No. 3137299
[Patent document 2] Japanese Unexamined Patent Application Publication No. 2013-70691
[Patent document 3] Japanese Unexamined Patent Application Publication No. 2012-80794

SUMMARY OF THE INVENTION

The present invention proposes a leash capable of making both hands of the owner always free during the walking. In addition, the leash can be easily attached and detached even when the shape and the thickness of the wrist vary depending on a person using the leash. Furthermore, even when the pet suddenly moves or riots in a state that the leash is attached, the leash is not detached from a body of the owner. In addition, the present invention proposes a leash capable of reducing the situation where the member contacting the wrist can be prevented from being rotated while contacting directly with the wrist even when the pet riots and pulls the rope in various directions in a state that the leash is attached. As a result, the possibility of the injury of the wrist can be reduced.

The present invention also has an effect that the movement of the pet can be immediately restricted by pulling the rope even when the pet riots.

Furthermore, the present invention proposes the configuration capable of performing various operations easily with hand during the walking even when the leash is attached to the wrist and capable of reducing the possibility of the detachment of the leash from the wrist even when the owner moves the hand intensely in a state that the leash is attached.

The leash of the present invention is basically formed using a rope similar to a generally known leash grasped by hands. In the generally known leash, an opening portion into which a wrist of the owner is inserted is a ring formed by winding the rope with one turn. On the contrary, the leash of the present invention is characterized in that the ring is formed by winding the rope with two or more turns. In addition, the present invention is also characterized in that a structure including a through hole for inserting the rope into the through hole is provided for keeping a part of a ring shape formed by winding the rope with two or more turns. The shape and the features of the structure including the through hole into which the rope is inserted will be explained below.

A size of the through hole is decided so that at least one rope can be inserted into the through hole. A gap is formed between the rope and the through hole. Thus, it is possible to move the position of the rope in the through hole by pulling the end of the rope so that the rope is slid in the through hole. An opening hole for inserting the wrist is formed on the center portion of the structure so that a fingertip to a wrist of a human can be inserted into the opening hole. The through hole is formed by a ring shape formed by winding the rope with two or more turns around the opening hole for inserting the wrist. Note that both ends of the rope inserted into the through hole and wound with two or more turns are joined and tightened with each other and the rope is extended from a joining portion to a portion connected to the pet as one rope. Therefore, as a matter of course, the through hole is opened at the both ends of the rope wound with two or more turns and the direction of opening the through hole is opposite to the opening hole for inserting the wrist (i.e., outward direction of the structure). Here, the two turns in this specification does not strictly means a state that the rope forms two rings. The phrase of the two turns also includes the state that the rope forms approximately two rings. If the rope is returned toward one direction (e.g., the direction of connecting the pet) while forming the ring, it can be said that the rope is wound with one turn. It is not necessary that the rope is returned to the original position strictly.

In addition, an intermediate portion of the through hole is opened (through hole is not formed) at the side of the opening hole for inserting the wrist with the length less than the length of one turn of the rope. Practically, the above described length of the opening is preferably an approximately a half to two thirds of the length of one turn of the rope. However, the length of the opening is not restricted. The rope inserted into the through hole is in an exposed state at the above described opening portion. Thus, there is no restriction structure for fixing the position of the rope and preventing the rope from being moved inward at the opening portion. For example, when the both ends of the rope wound with two or more turns are pulled outward of the structure, the rope located at the opening portion moves in the direction connecting both ends of the through hole at a shortest distance.

The rope to which the pet is connected is inserted into the through hole of the structure having the above described features and the both ends of the rope is joined together at the both ends of the through hole. Consequently, even when the pet pulls the rope and the force is applied to the rope in the direction where the leash is separated from the owner, the rope is tightened to the wrist inserted into the opening hole for inserting the wrist by a tensile force generated by the force applied to the both ends of the rope. Thus, the rope is prevented from being detached from the wrist.

The present invention also proposes the leash where the structure for keeping a part of the ring shape of the rope wound with two or more turns has a shape surrounding a part of the rope in a circumferential direction of the ring shape without surrounding an entire outer circumference of the wrist. In the above described leash, the size of the structure can be reduced. Thus, various operations can be easily performed when the operations are performed with hands in a state that the leash is tightened to the wrist during the walking.

Note that the size of the cut range, the shape of the cut surface, the position and the inclination of the through hole formed at the cut surface into which the rope is inserted are not limited as long as a part of the outer circumference of the structure is opened. The present invention also proposes the configuration of partially reducing the thickness of the structure and forming holes on a part of the structure for reducing the weight of the structure as an effective means. However, the position and the range of reducing the thickness of the structure and the shape, the size and the position of forming the holes are not particularly limited.

When the wrist is inserted into the leash and then the leash is pulled from the end to be connected to the pet to tighten the leash to the wrist, only the rope wound around the wrist and the rope coming out from the through hole of the structure and leading to the end to which the pet is connected exist in the range other than the outer circumference range of the structure of the through hole into which the rope is formed. Thus, there is not structure except for the rope in the above described space. Consequently, the fingertip, the wrist and further the arm can be inserted into a relatively small space in a state that the leash is attached to the wrist. Furthermore, the wrist can be freely and easily moved in the above described state.

When the leash of the present invention is used in a state that the leash is attached to the wrist, the possibility of the detachment of the leash from the wrist can be eliminated even when the pet moves or riots unexpectedly and pulls the leash in various directions. In addition, the possibility of the injury of the wrist can be reduced by preventing the leash from being rotated while rubbing against the wrist. As a result, the owner can dispose excrement, prepare a water bottle for giving water to the pet or perform the other operations free from anxiety in a state that the wrist is inserted into the leash during the walking.

In addition, even when the pet moves or riots unexpectedly, the rope necessarily exists near the wrist. Thus, it is possible to grasp the rope immediately to restrict the movement of the pet. The above described point also makes the owner feel free from anxiety. In addition, a part of the structure is cut in the leash. Thus, the owner can dispose excrement, prepare a water bottle for giving water to the pet or perform other operations easily in even if an inlet of a bag used for the walking is relatively narrow. Furthermore, even when the owner moves the hand intensely in the operations during the walking, the weight of the leash itself attached to the wrist is relatively small. Thus, the possibility of the detachment of the leash from the wrist can be reduced.

Since the main purpose of using the leash is to restrict the movement of the pet, a dominant hand is mainly used for easily restricting the movement of the pet. However, it is relatively convenient to use a dominant hand also when disposing excrement, preparing to give water to the pet or performing the other operations. It can be said that the leash of the present invention has high practicability since both the restriction of the movement of the pet and the operations during the walking can be performed by a dominant hand.

DETAILED DESCRIPTION OF THE INVENTION

The basic structure of the present invention is the combination of two components comprising: a rope 1 to which the pet is connected; and a structure 2 including a through hole 7 for keeping a part of a ring shape of the rope 1 wound with two or more turns.

In various embodiments explained below, the number of the turns of ring formed by winding the rope 1 is two, which is the typical configuration of the preset invention, in all examples except for the example shown in FIG. 24.

Figure 1:
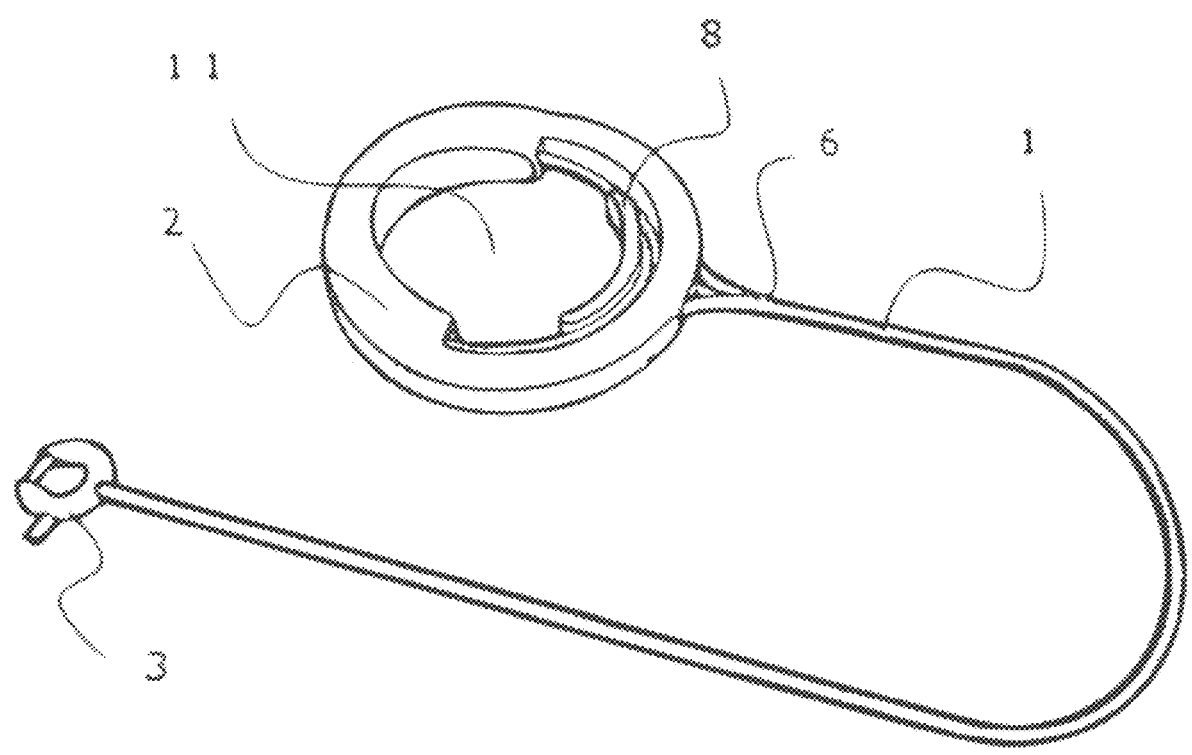
FIG. 1 is an overall drawing of a leash.

FIG. 1 shows an example of an overall drawing of the leash having a ring-shape formed by winding the rope 1. A metal hook 3 for connecting the pet is attached to one end of the rope 1, while another end of the rope 1 is connected to the structure 2 to be tightened to a wrist 10 of the owner.

Figure 2:
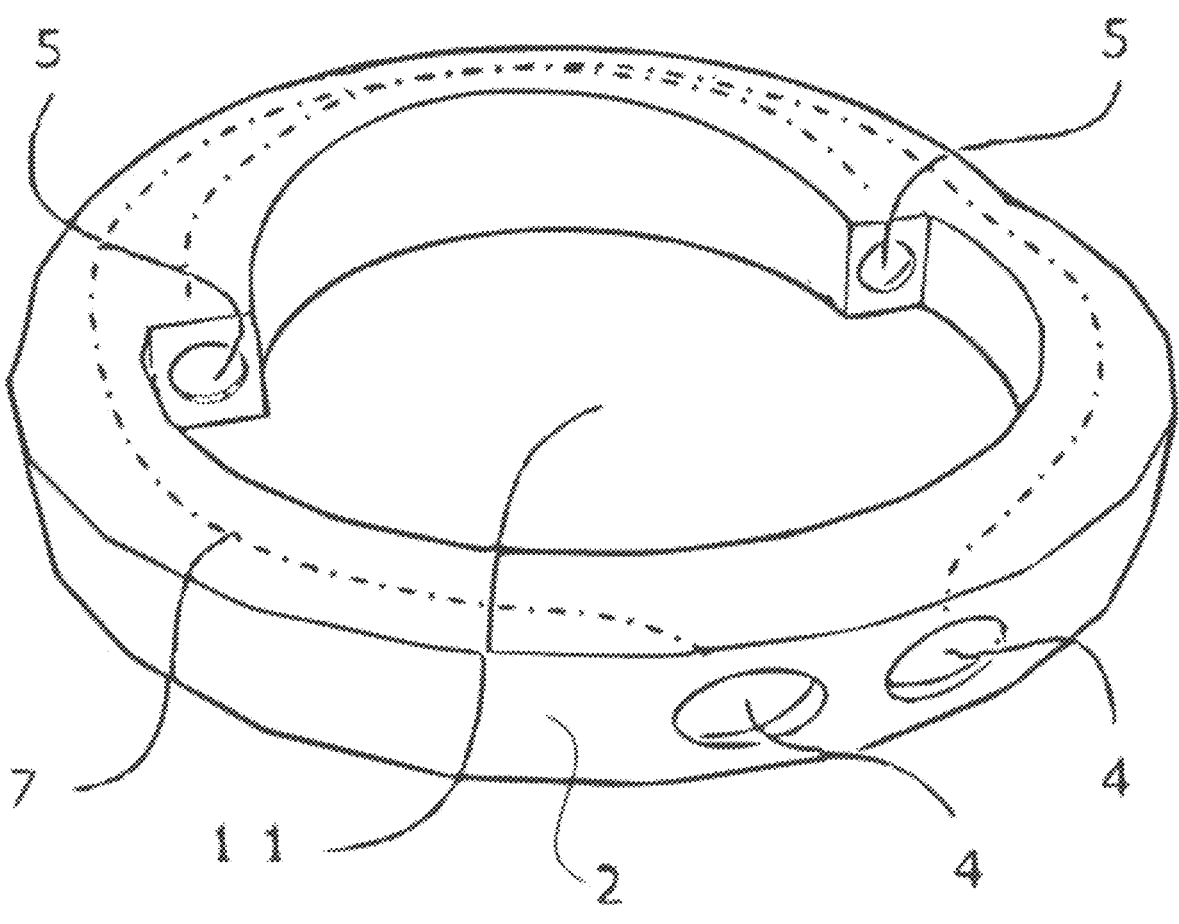
FIG. 2 is a drawing showing a shape of a structure.

FIG. 2 shows an example of the shape of the structure 2 in the example where the ring-shape is formed by winding the rope 1. In this example, the structure 2 has a cylindrical outer shape for forming the through hole 7 having the ring-shape to which a part of the rope 1 is inserted. Although the outer shape and the size of the structure 2 are not restricted in the present invention, it is preferred that the size and the weight of the structure 2 are minimized. This is because the leash may be obstructive during the walking or may be detached from the wrist 10 when the wrist 10 is moved intensely in a state that the wrist 10 is inserted if the outer shape is large and the leash becomes heavy.

In addition, an opening hole 11 for inserting the wrist is provided inside the structure 2. The opening hole 11 is formed into a ring by the structure 2 and a freely movable portion of the rope 1 not inserted into the through hole 7 of the structure 2. An inside size of the above described ring can be reduced by pulling the rope 1 from an end of the rope 1 connected to the pet and the inside size can be enlarged by loosening the rope 1. The maximum size of the inside size of the ring is a size capable of inserting a fingertip to a wrist of a human into the ring. The minimum size of the inside size of the ring is smaller than an outer periphery of the wrist. The freely movable portion of the rope 1 not inserted into the through hole 7 of the structure 2 is provided at an intermediate portion between both ends of the ring shape of the rope 1. It is preferred that the freely movable portion of the rope 1 not inserted into the through hole 7 of the structure 2 is provided at a center of the both ends of the ring shape of the rope 1. In this example, the through hole 7 is opened at four portions in all. Two opening holes 4 of the both outer end portions of the rope 1 are formed on the outer surface of the structure 2, while two opening holes 5 of the center portion of the rope 1 are formed on the inner surface of the structure 2. It is necessary that the rope 1 can be freely moved in the through hole 7 when the rope 1 is pulled. Thus, the material forming the through hole 7 is preferably the material having a small frictional force to the rope 1 so that the rope 1 can be easily slid and the through hole 7 has high wear resistance. The shape of the inlet/outlet opened at four portions is preferably a smooth shape for preventing the rope 1 from being caught at the inlet/outlet. It is preferable to consider to improve the smoothness and the wear resistance also for the rope 1 which is a mating member of the structure 2.

Figure 3:
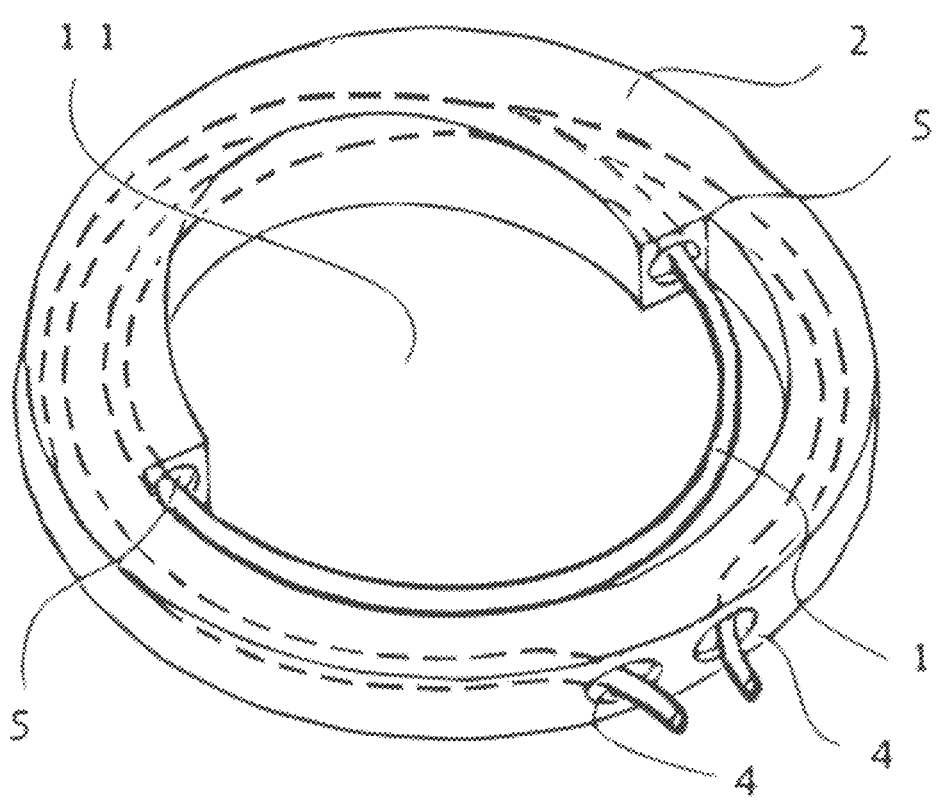
FIG. 3 is a first explanation drawing showing a through hole of the structure.
Figure 4:
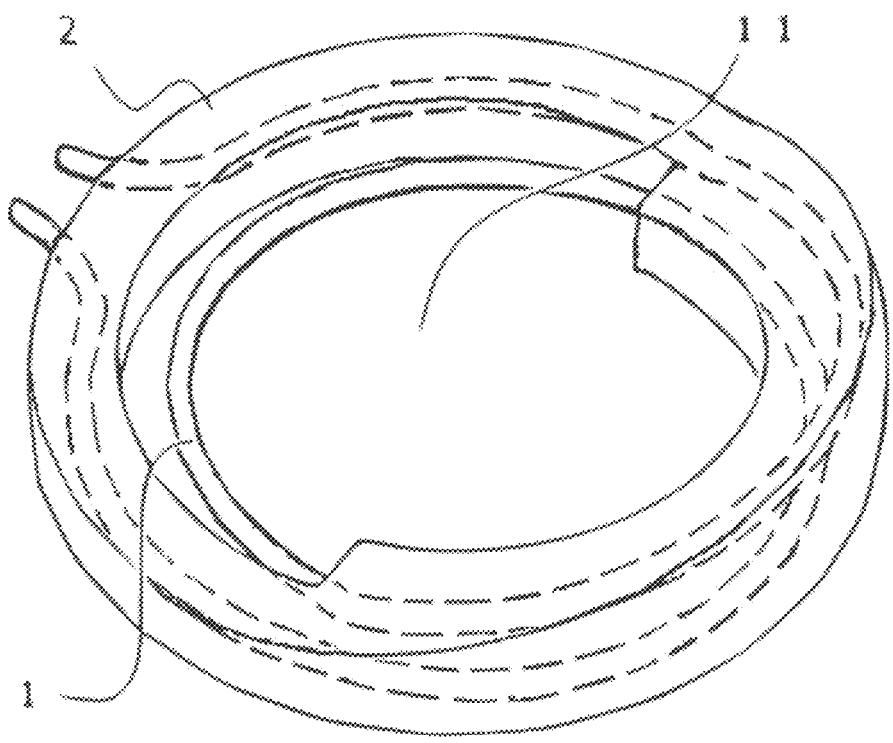
FIG. 4 is a second explanation drawing showing the through hole of the structure.

FIG. 3 and FIG. 4 are transparent drawings viewed from two directions for explaining a state that the rope 1 is inserted into the through hole 7 provided on the structure 2. The through hole 7 has a three-dimensionally displaced loop shape so that the rope 1 inserted from the opening holes 4 of the both outer end portions of the rope 1 formed on the outer surface of the structure 2 can be wound with two turns. In addition, the rope 1 located between the opening holes 5 of the center portion of the rope 1 formed on the inner surface of the structure 2 is in an opened state where the position of the rope 1 is not restricted. Thus, the rope 1 can be freely moved in accordance with the length of the rope 1 between the opening holes 5 of the center portion of the rope 1.

Figure 5:
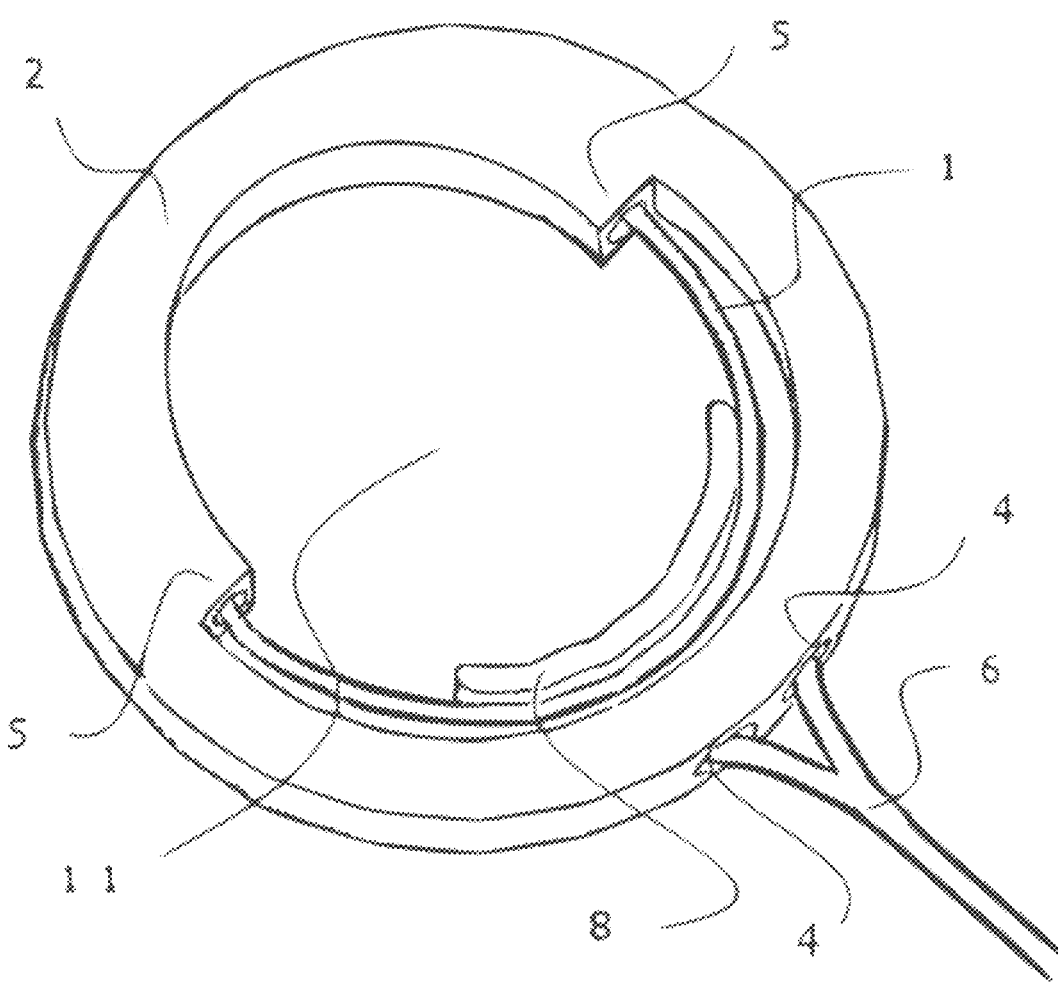
FIG. 5 is an explanation drawing for assembling the leash.

FIG. 5 is an explanation drawing of the structure of the leash assembled by using the rope 1, the structure 2 and a wrist contact pad 8 at an end to be grasped by the owner. End portions of the rope 1 comes out from the opening holes 4 of the both outer end portions of the rope 1 formed on the outer surface of the structure 2 are connected with each other near the opening holes 4. Thus, a joining portion 6 of the rope 1 is formed. As for the position of the joining portion 6 of the rope 1, when the rope 1 arranged inside the structure 2 is spread until the rope 1 is arranged along a circumference of the opening hole 11 of the structure 2 for inserting the wrist, the joining portion 6 of the rope 1 is just in contact with the outer peripheral surface of the structure 2 and the rope 1 is not inserted from the opening holes 4 of the both outer end portions of the rope 1 formed on the outer surface of the structure 2 to inside the through hole 7 anymore. The above described position of the joining portion 6 is preferred since the rope 1 is unnecessarily loosened at the portion of the opening hole 11 for inserting wrist.

In addition, the wrist contact pad 8 can play a role of a buffer material for preventing the rope 1 from directly abutting the wrist 10. The wrist contact pad 8 has a cross-sectional shape which cannot be inserted into the through hole 7 of the structure 2 at the intermediate portion of the rope where the rope can be moved freely. When the rope 1 is pulled toward the end to which the pet is connected, the wrist contact pad 8 can play a role of preventing the opening hole 11 for inserting wrist from being narrowed more than necessary depending on the setting of the size of the rope 1 for tightening the wrist in the length direction. Although the position and the posture of the wrist contact pad 8 can be completely fixed to the rope 1, it is practically effective to provide a through hole on the wrist contact pad 8 and insert the rope 1 into the through hole for preventing the wrist contact pad 8 from being detached from the rope 1 in a state that the wrist contact pad 8 can be moved freely to a certain extent depending on the difference of the outer circumferential shape of the wrist 10 abutting with the wrist contact pad 8 or the difference of the pulled situation of the rope 1 when the wrist 10 is inserted and fixed to the rope 1.

Figure 6:
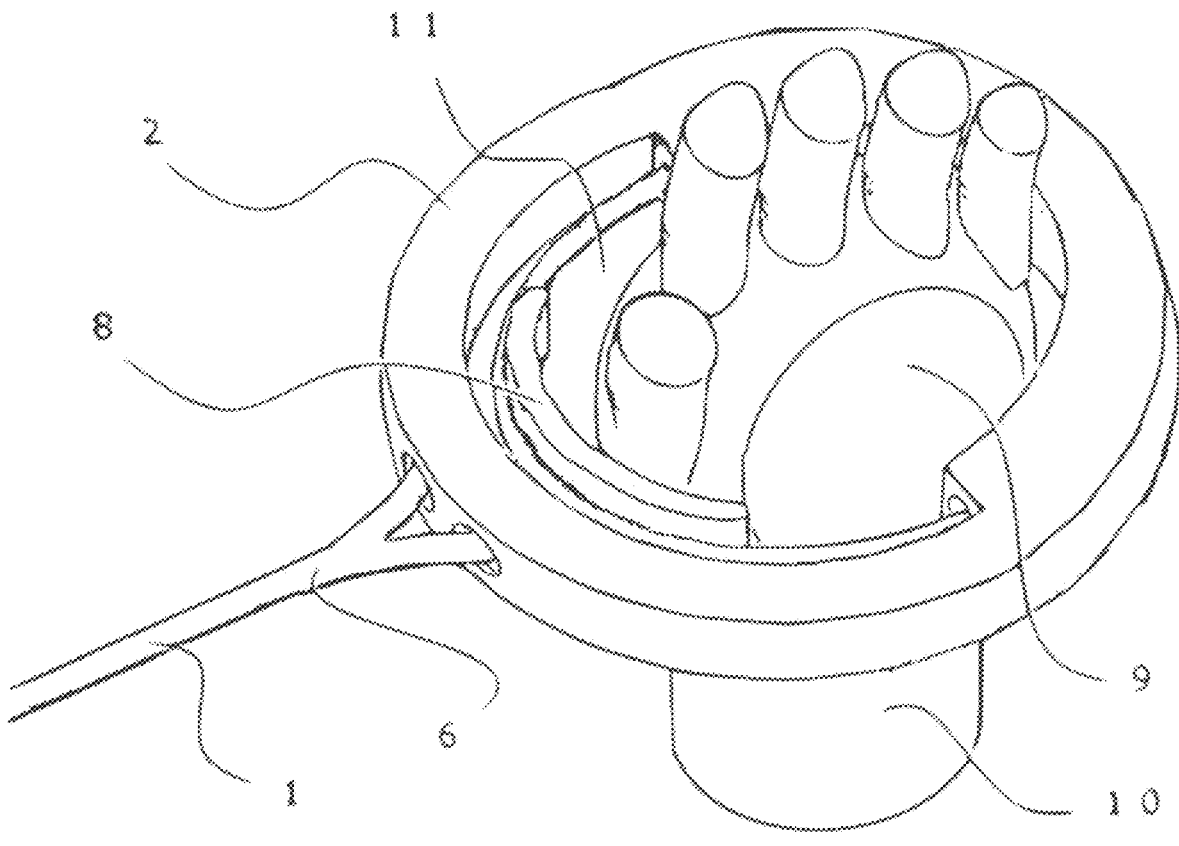
FIG. 6 is a perspective view for explaining an operation of inserting the wrist.
Figure 7:
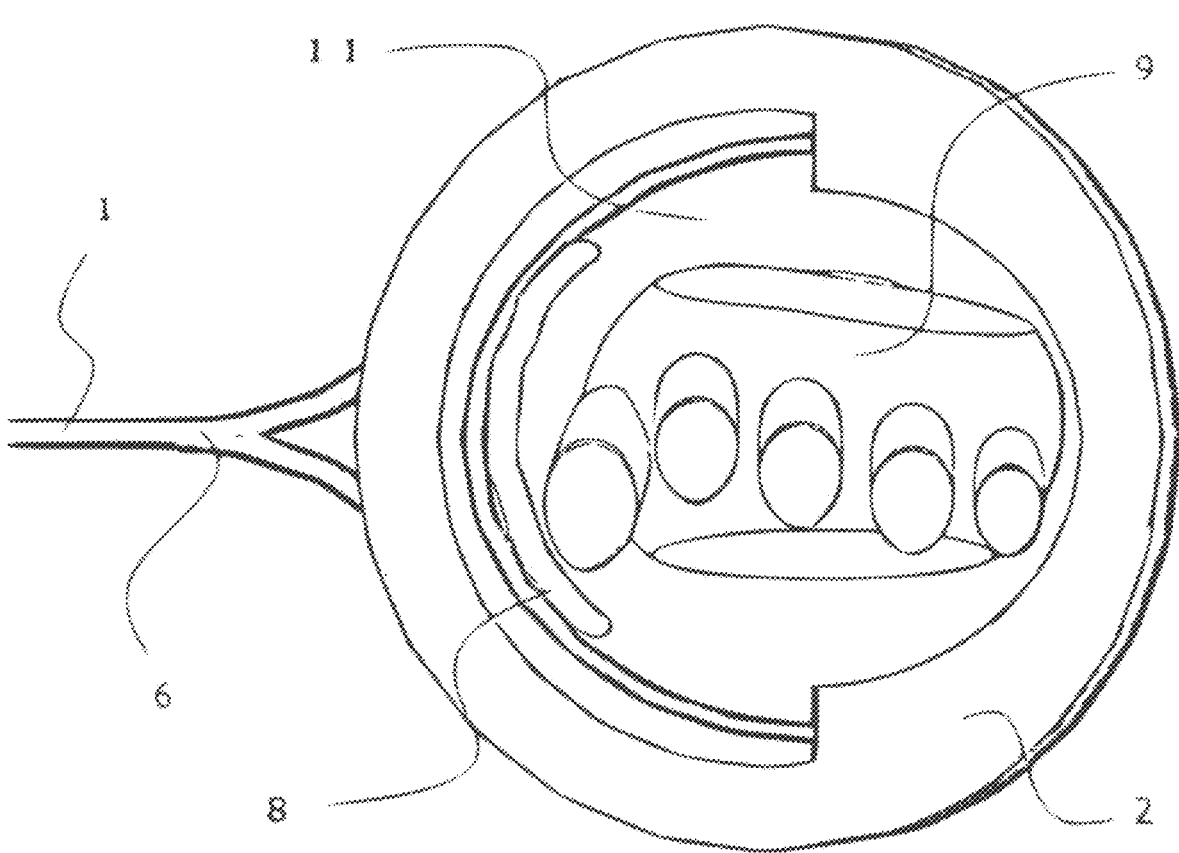
FIG. 7 is a plan view for explaining the operation of inserting the wrist.

FIG. 6 and FIG. 7 explain the state that the owner inserts a palm 9 into the opening hole 11 for inserting wrist of the structure 2. Since the palm 9 is larger than the wrist 10, the wrist 10 can be easily inserted into the opening hole 11 by loosening the rope 1 located at the opening hole 11 for inserting the wrist 10 as much as possible.

Figure 8:
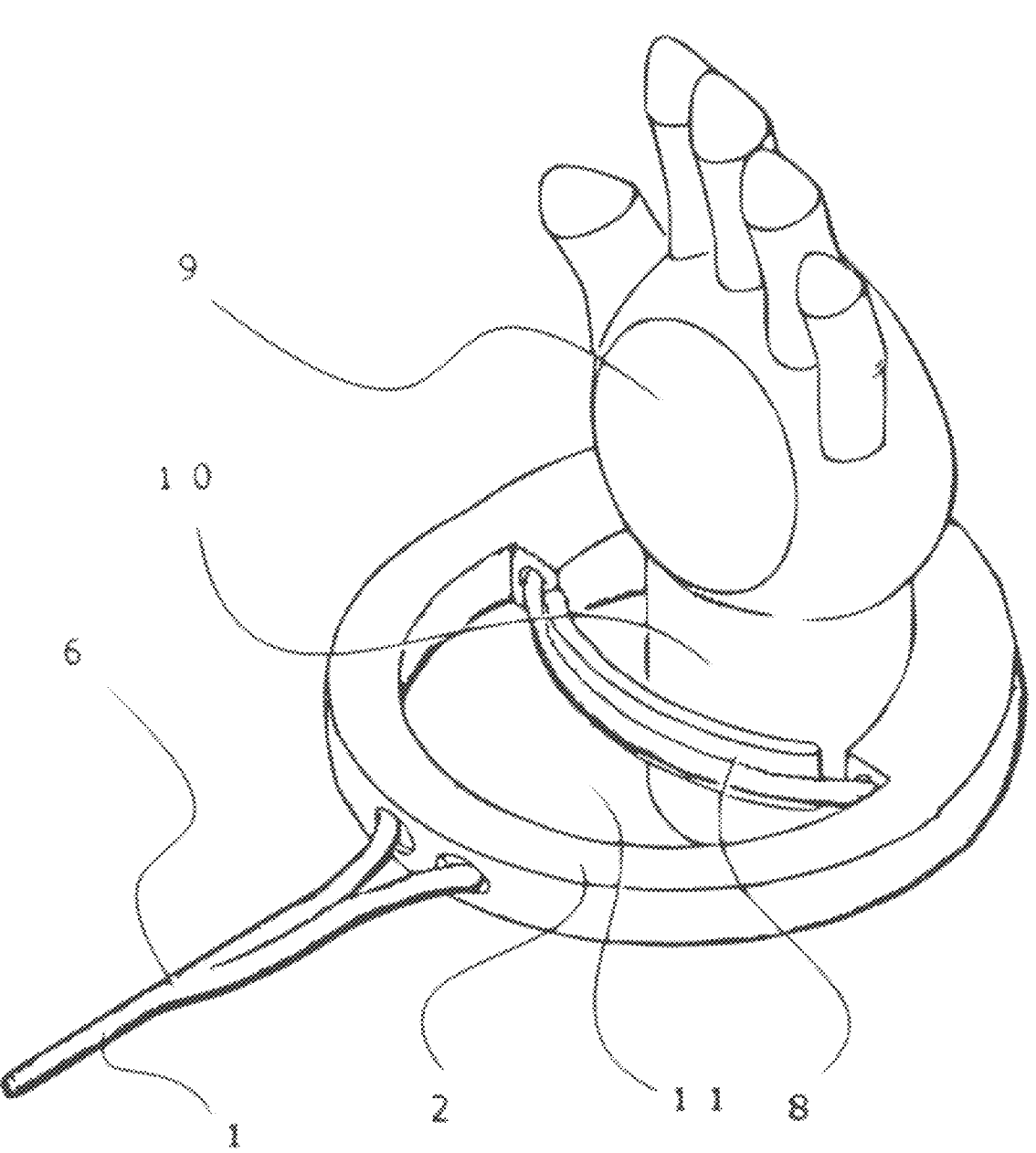
FIG. 8 is a perspective view for explaining an operation of tightening a rope to the wrist.
Figure 9:
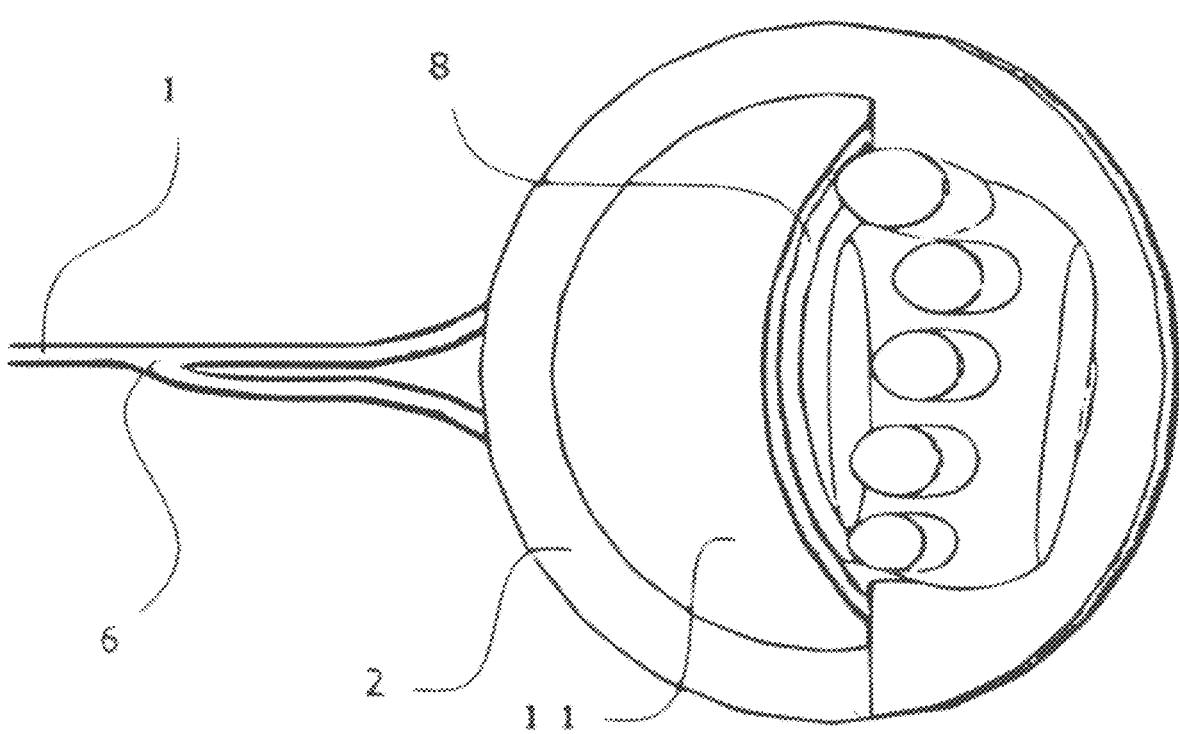
FIG. 9 is a plan view for explaining an operation of tightening the rope to the wrist.

FIG. 8 and FIG. 9 explain the state that the fingertip to the wrist 10 is inserted into the opening hole 11 for inserting wrist 10 of the structure 2, then the rope 1 is pulled toward the end to which the pet is connected and the rope 1 located at the opening hole 11 for inserting wrist 10 is wound around the wrist 10. When attaching the leash before the walking, the leash can be tightened to the wrist 10 only by a simple operation of inserting the wrist 10 into the opening hole 11 and then pulling the rope 1. After the leash is attached, even when the pet suddenly moves or riots, the more the pet pulls the rope 1, the more force is applied in the direction of tightening the rope 1 to the wrist 10. Thus, it is possible to prevent the detachment of the leash from the wrist 10. When detaching the leash from the wrist 10, the leash can be easily detached from the wrist 10 by grasping the structure 2 and pulling the hand out of the structure 2 since the rope 1 is expanded in accordance with the shape of the palm 9 to be inserted unless the pet pulls the rope 1.

FIG. 10 to FIG. 18 show the shape where a part of the outer circumference of the structure 2 is cut without surrounding the whole circumference of the outer surface of the wrist 10. Although a plurality of specific examples is shown, the specific examples can be separately used for different purposes depending on the point to be prioritized when used as the leash since there are advantages and disadvantages in each of the specific examples.

Figure 10:
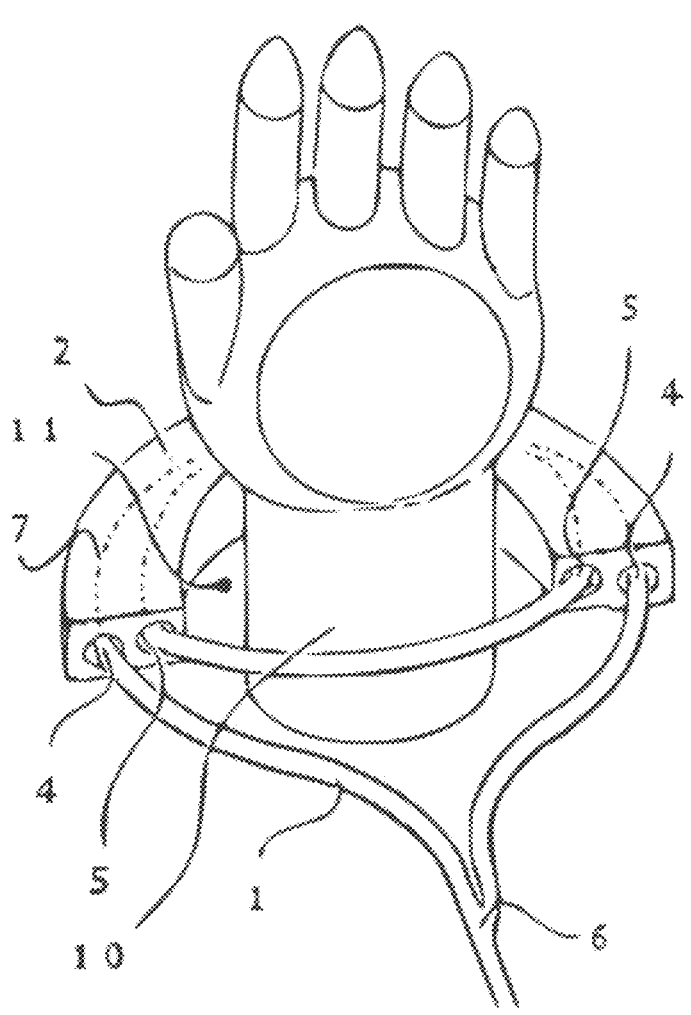
FIG. 10 is the first example of cutting the structure (example of the shape of the structure where inlet/outlet of the through hole are linearly arranged).

The example of the shape of the structure 2 shown in FIG. 10 is the example where the opening holes 4 of the both outer end portions of the rope 1 and the opening holes 5 of center portion of the rope 1 are arranged on one straight line. Since the opening holes 4 of the both outer end portions of the rope are arranged on the outside of the opening holes 5 of the center portion of the rope, the rope 1 coming out from the opening holes 4 of both outer end portions of the rope 1 and the rope 1 coming out from the opening holes 5 of center portion of the rope 1 are prevented from contacting each other and obstructing the movement each other when the rope 1 is wound around the wrist 10 by pulling the rope 1 toward the end to which the pet is connected or when the rope 1 located between the two opening holes 5 of the center portion of the rope 1 is loosened by pulling the rope 1 for removing the wrist 10 from the structure 2. Consequently, the attachment/detachment of the leash to/from the wrist 10 can be performed smoothly. Since the two through holes 7 formed on the structure 2 should be three-dimensionally crossed with each other inside the structure 2, the structure of the structure 2 is complicated and the outer shape becomes large.

Figure 11:
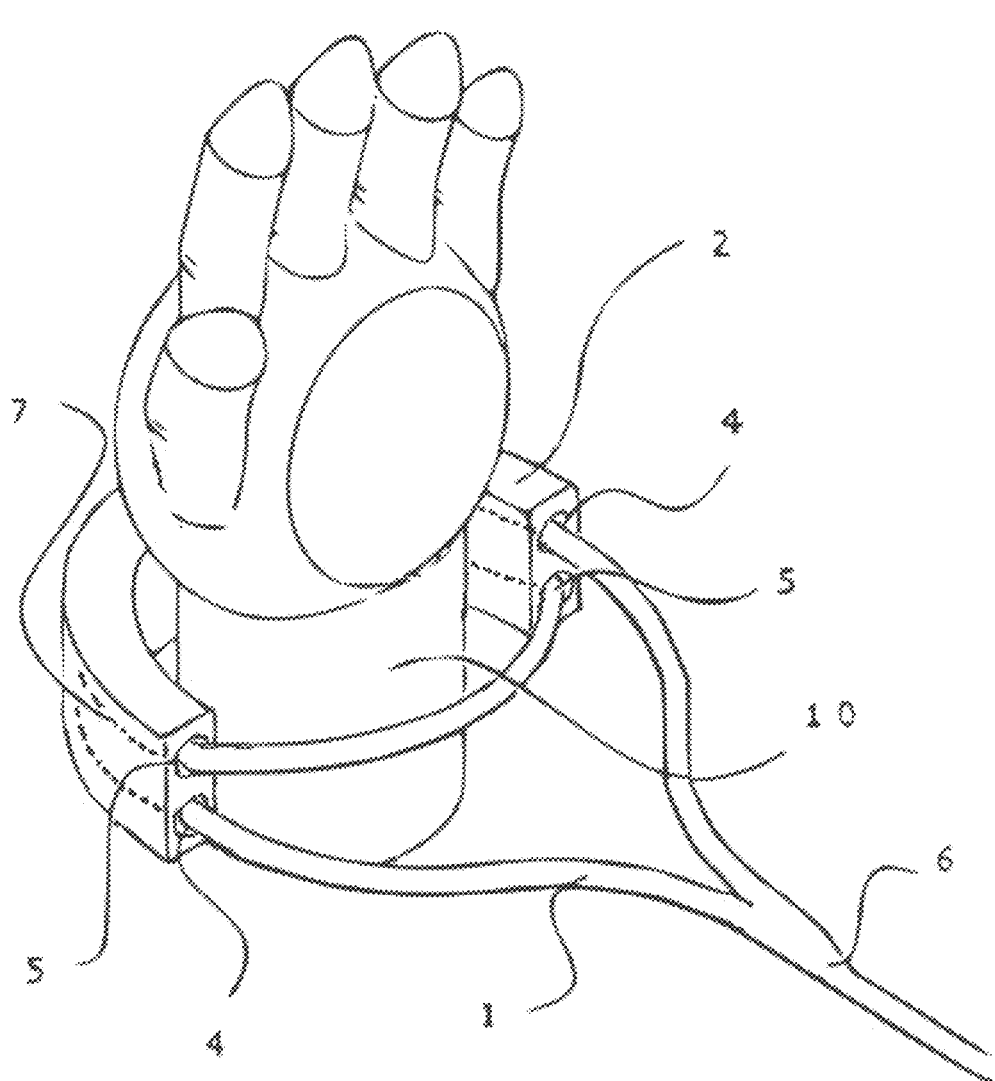
FIG. 11 is the second example of cutting the structure (example of the shape of the structure where the inlet/outlet of the through hole are arranged in parallel).

In the example of the shape of the structure 2 shown in FIG. 11, it is not necessary to form the opening holes 4 of the both outer end portions of the rope 1 and the opening holes 5 of the center portion of the rope 1 three-dimensionally crossed with each other inside the structure 2, the structure of the structure 2 is relatively simple and the outer shape can be kept small. Instead, the positional relation between the opening holes 4 of the both outer end portions of the rope 1 and the opening holes 5 of the center portion of the rope 1 are vertically reversed to each other between the left and right sides in the direction of inserting the wrist. Thus, the rope 1 coming out from the opening holes 4 of the both outer end portions of the rope 1 and the rope 1 coming out from the opening holes 5 of the center portion of the rope 1 contact with each other and obstruct the movement each other when the rope 1 located between the two opening holes 5 of the center portion of the rope 1 is loosened by pulling the rope 1 for removing the wrist 10 from the structure 2. Consequently, the operation of attaching/detaching the leash to/from the wrist 10 may become relatively difficult compared to the example of the shape shown in FIG. 10.

Figure 12:
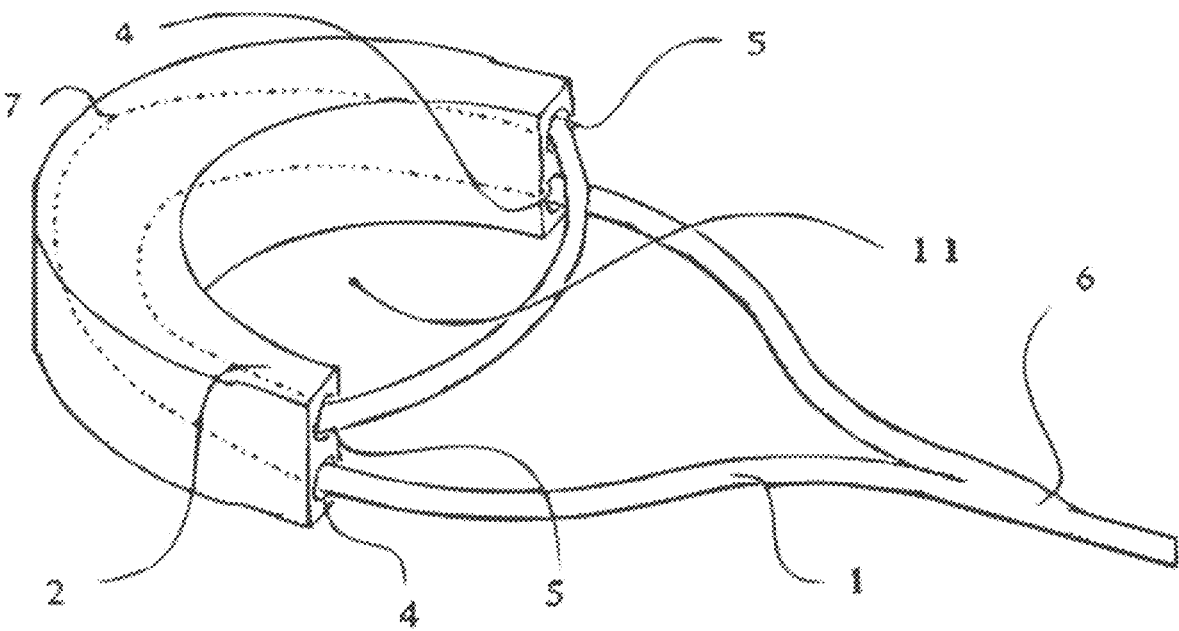
FIG. 12 is the third example of cutting the structure (example of the shape of the structure where the inlet/outlet of the rope are arranged in parallel).

The example of the shape of the structure 2 shown in FIG. 12 is the example where the positional relation between the opening holes 4 of the both outer end portions of the rope 1 and the opening holes 5 of the center portion of the rope 1 are the same between the left and right sides in the direction in parallel with the direction of inserting the wrist based on the example of the shape shown in FIG. 11. The possibility of the contact between the rope 1 coming out from the opening holes 4 of the both outer end portions of the rope 1 and the rope 1 coming out from the opening holes 5 of the center portion of the rope 1 and the possibility of the obstruction of the movement each other can be reduced. However, the two through hole 7 formed on the structure 2 should be three-dimensionally crossed with each other inside the structure 2. Thus, the outer shape of the structure 2 is partly wide and the structure is complicated.

Figure 13:
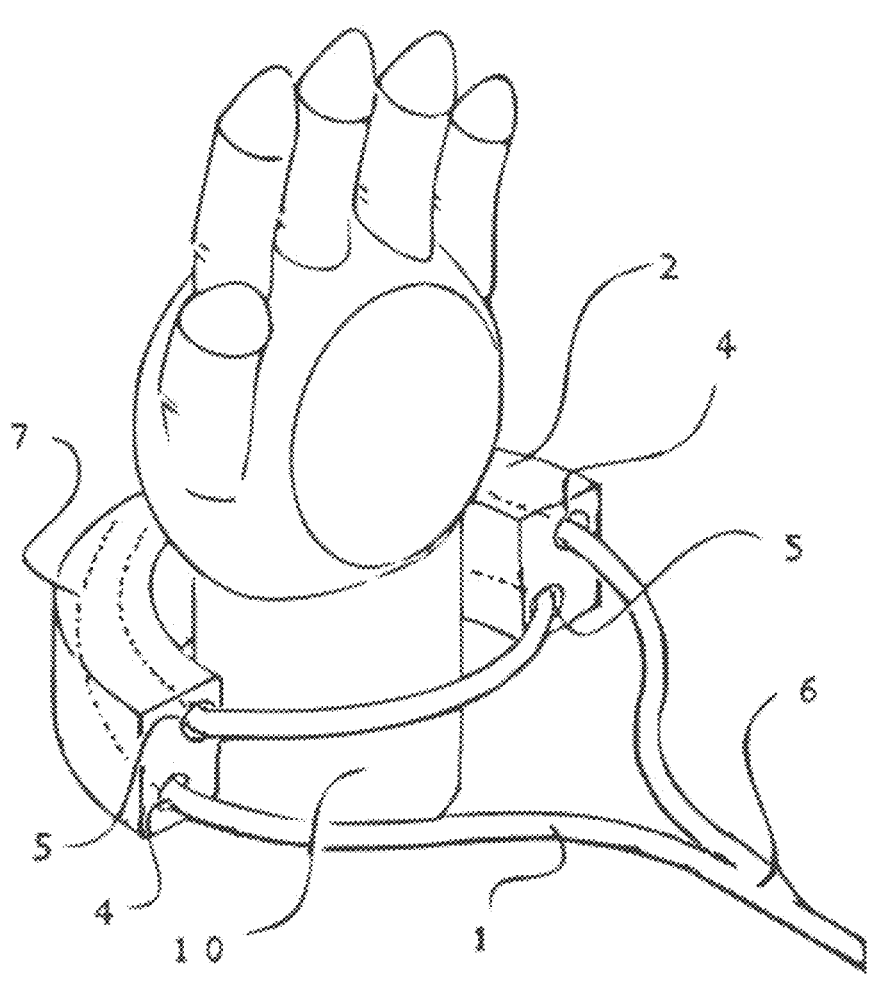
FIG. 13 is the fourth example of cutting the structure (example of the shape of the structure where the inlet/outlet of the rope are arranged for avoiding the contact of the rope).

The example of the shape of the structure 2 shown in FIG. 13 is the example where the possibility of the contact between the rope 1 coming out from the opening holes 4 of the both outer end portions of the rope 1 and the rope 1 coming out from the opening holes 5 of the center portion of the rope 1 and the possibility of the obstruction of the movement each other are reduced without complicating the configuration of the structure 2 (e.g., without three-dimensional crossing of the through hole 7) based on the shape of the example of the shape shown in FIG. 11. It is possible to reduce the possibility of the contact between the rope 1 coming out from the opening holes 4 of the both outer end portions of the rope 1 and the rope 1 coming out from the opening holes 5 of the center portion of the rope 1 and the possibility of the obstruction of the movement each other by slightly enlarging the outer shape of the structure 2 and slightly moving the positions of the two opening holes 4 of the both outer end portions of the rope 1 in the direction separating from the wrist 10. Consequently, it is possible to attach/detach the wrist 10 to/from the leash smoothly.

Figure 14:
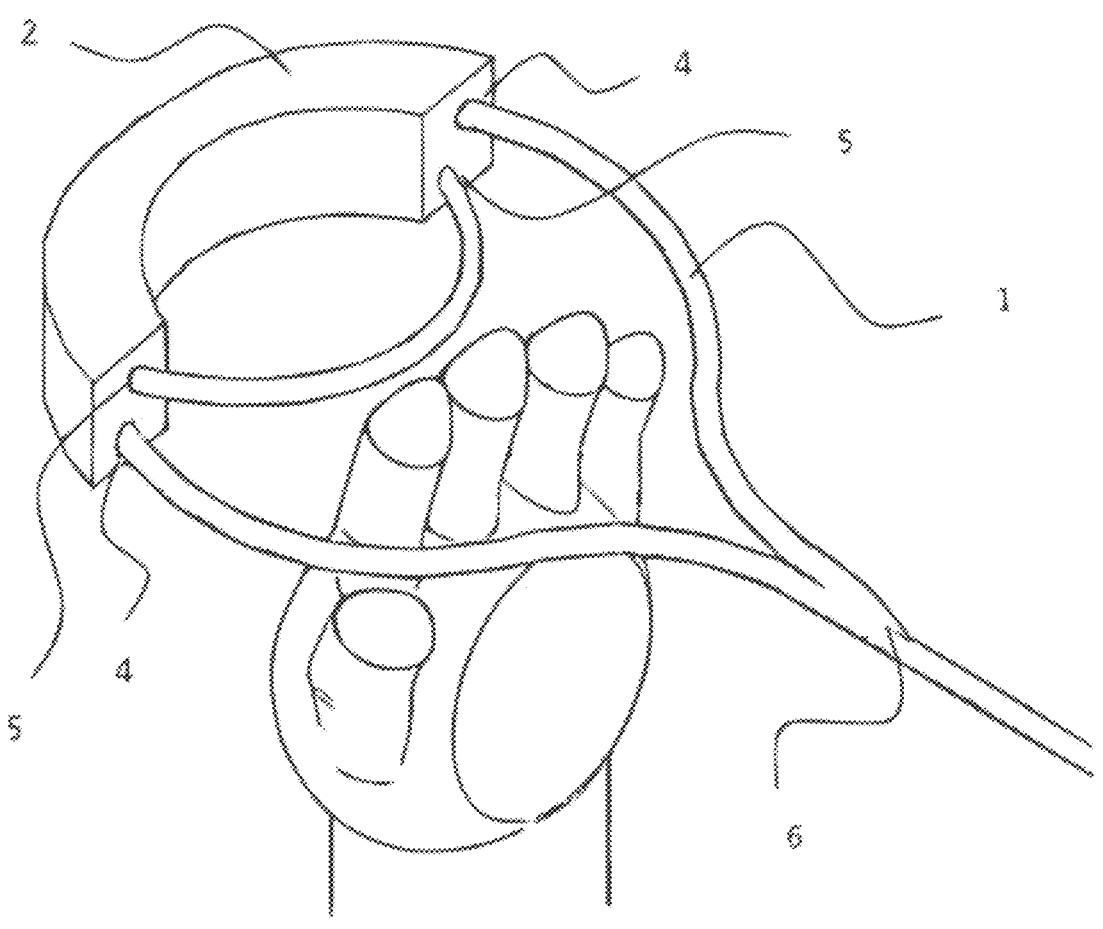
FIG. 14 is the fifth example of cutting the structure (example of the shape of the structure having short circumference length).

The example of the shape of the structure 2 shown in FIG. 14 is the example where the length of the structure 2 is shortened in the outer circumferential direction of the wrist based on the example of the shape shown in FIG. 11. Since the position of the rope 1 not inserted into the through hole 7 of the structure 2 is freely moved, it is difficult to use the above described portion of the rope as a reference for estimating the correct position of inserting the wrist 10 when attaching the leash. Thus, the correct position for inserting the wrist 10 is estimated from the inner diameter of the structure 2. In the above described example of the shape, the structure 2 is small. Thus, the wrist can be freely and easily moved after the leash is tightened to the wrist 10 in a state that the leash is attached even when the fingertip, the wrist 10 and further the arm are inserted into a relatively narrow space.

Figure 15:
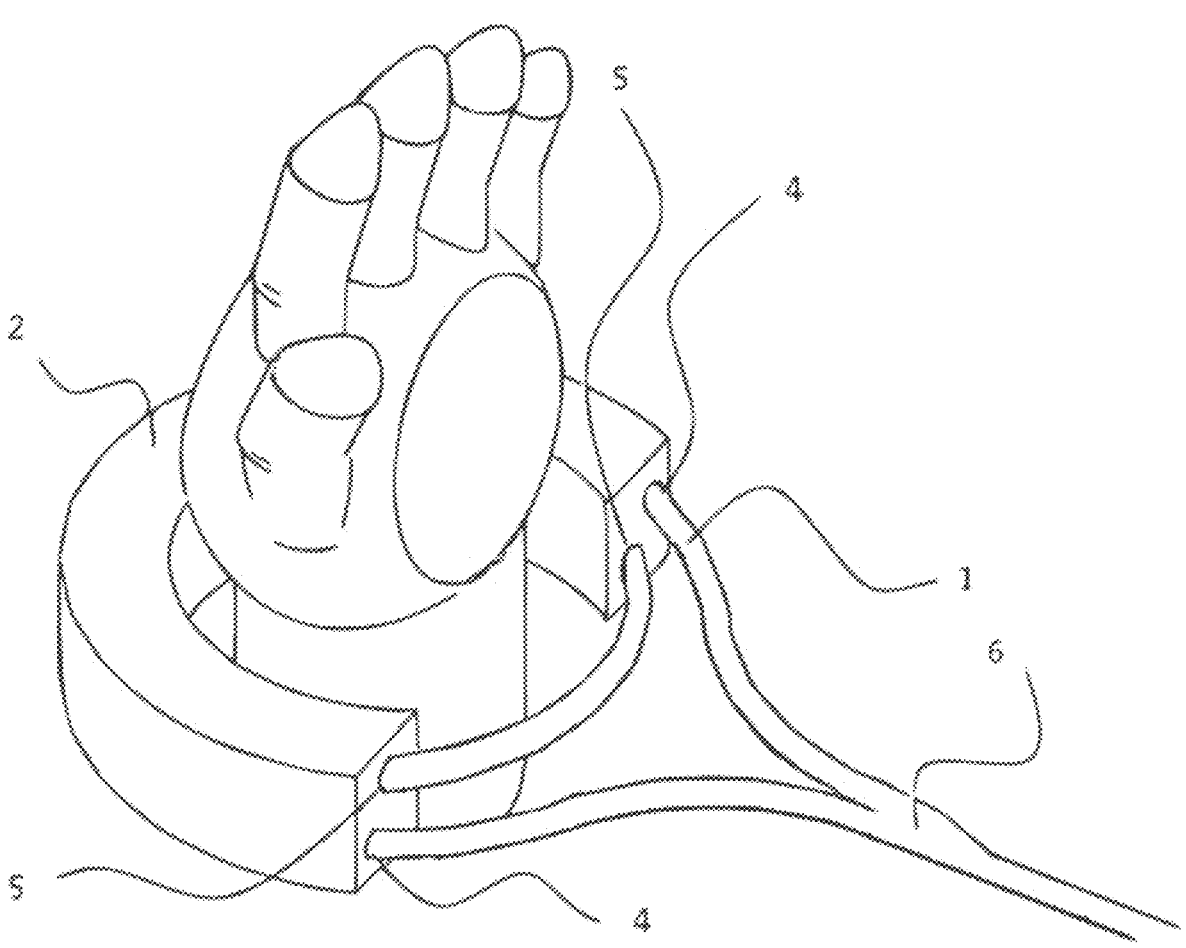
FIG. 15 is the sixth example of cutting the structure (example of the shape of the structure having long circumference length).

The example of the shape of the structure 2 shown in FIG. 15 is the example where the length of the structure 2 is extended in the outer circumferential direction of the wrist based on the example of the shape shown in FIG. 11. In the above described example of the shape, the structure 2 is large. Thus, it is difficult to insert the fingertip, the wrist 10 and further the arm into a relatively narrow space and it is difficult to move the wrist freely in a state that the wrist 10 and the arm are inserted into a relatively narrow space. However, the correct position for inserting the wrist 10 when attaching the leash can be easily recognized.

Figure 16:
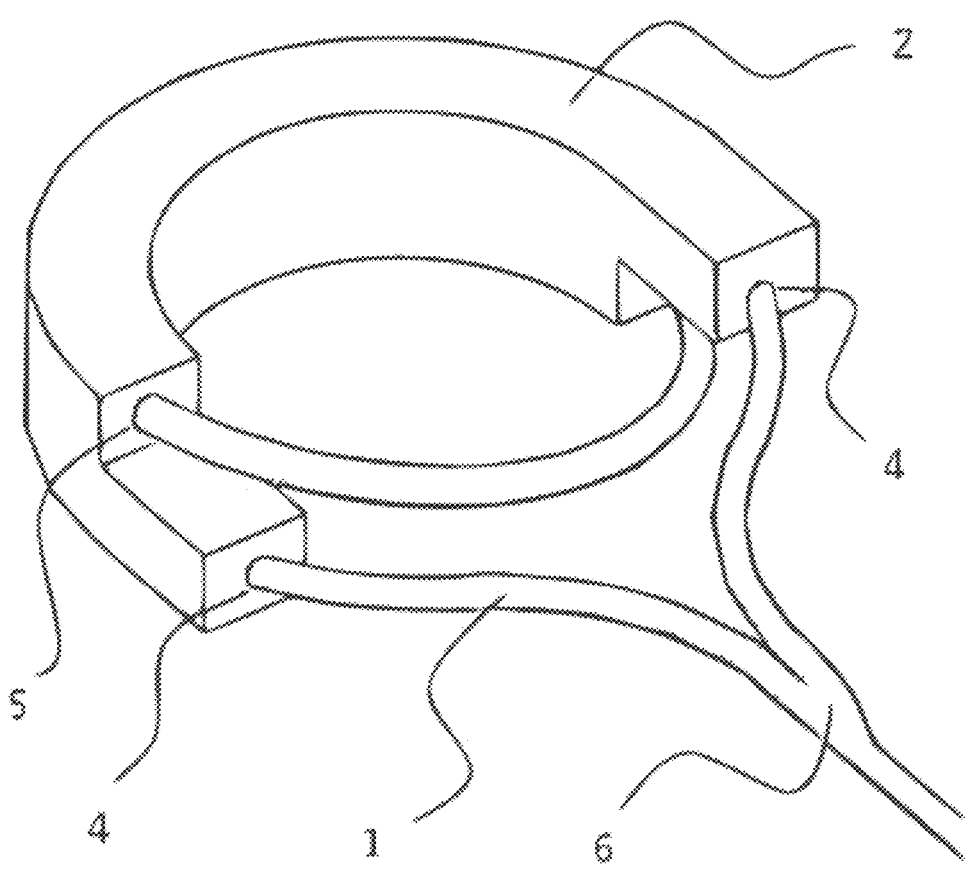
FIG. 16 is the seventh example of cutting the structure (first variation example of the inlet/outlet of the through hole).

The example of the shape of the structure 2 shown in FIG. 16 is the example where the positions of the surfaces of arranging the opening holes 4 of the both outer end portions of the rope 1 and the opening holes 5 of the center portion of the rope 1 of the structure 2 are different from each other in the four holes. In the above described example, the neighboring inlet and outlet of the rope 1 formed by the opening holes 4 of the both outer end portions of the rope 1 and the opening holes 5 of the center portion of the rope 1 are located on the surfaces separated from each other. In addition, the possibility of the contact between the rope 1 coming out from the opening holes 4 of the both outer end portions of the rope 1 and the rope 1 coming out from the opening holes 5 of the center portion of the rope 1 and the possibility of the obstruction of the movement each other are reduced.

Figure 17:
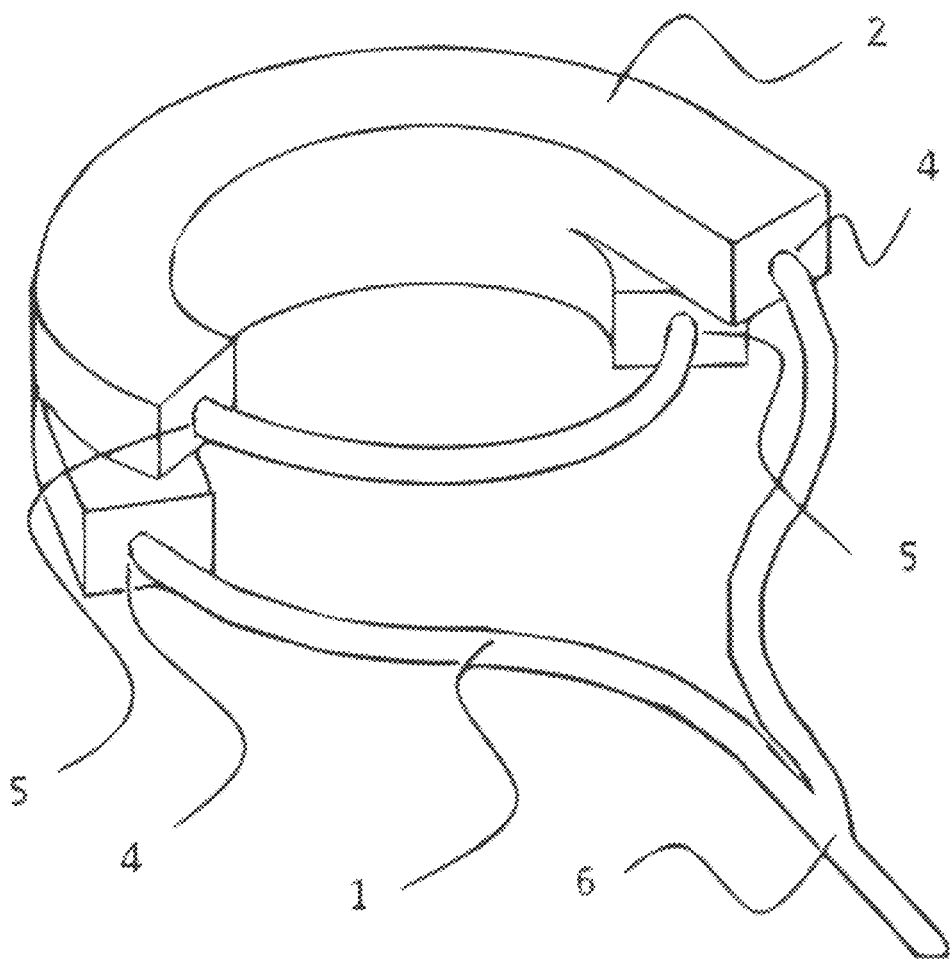
FIG. 17 is the eighth example of cutting the structure (second variation example of the inlet/outlet of the through hole).

The example of the shape of the structure 2 shown in FIG. 17 is the example where the angles of the opening holes 4 of the both outer end portions of the rope 1 and the opening holes 5 of the center portion of the rope 1 of the structure 2 are different from each other in the four holes. In the above described example, the angles of the neighboring holes of the opening holes 4 of the both outer end portions of the rope 1 and the opening holes 5 of the center portion of the rope 1 are different from each other. In addition, the possibility of the contact between the rope 1 coming out from the opening holes 4 of the both outer end portions of the rope 1 and the rope 1 coming out from the opening holes 5 of the center portion of the rope 1 and the possibility of the obstruction of the movement each other are reduced.

Figure 18:
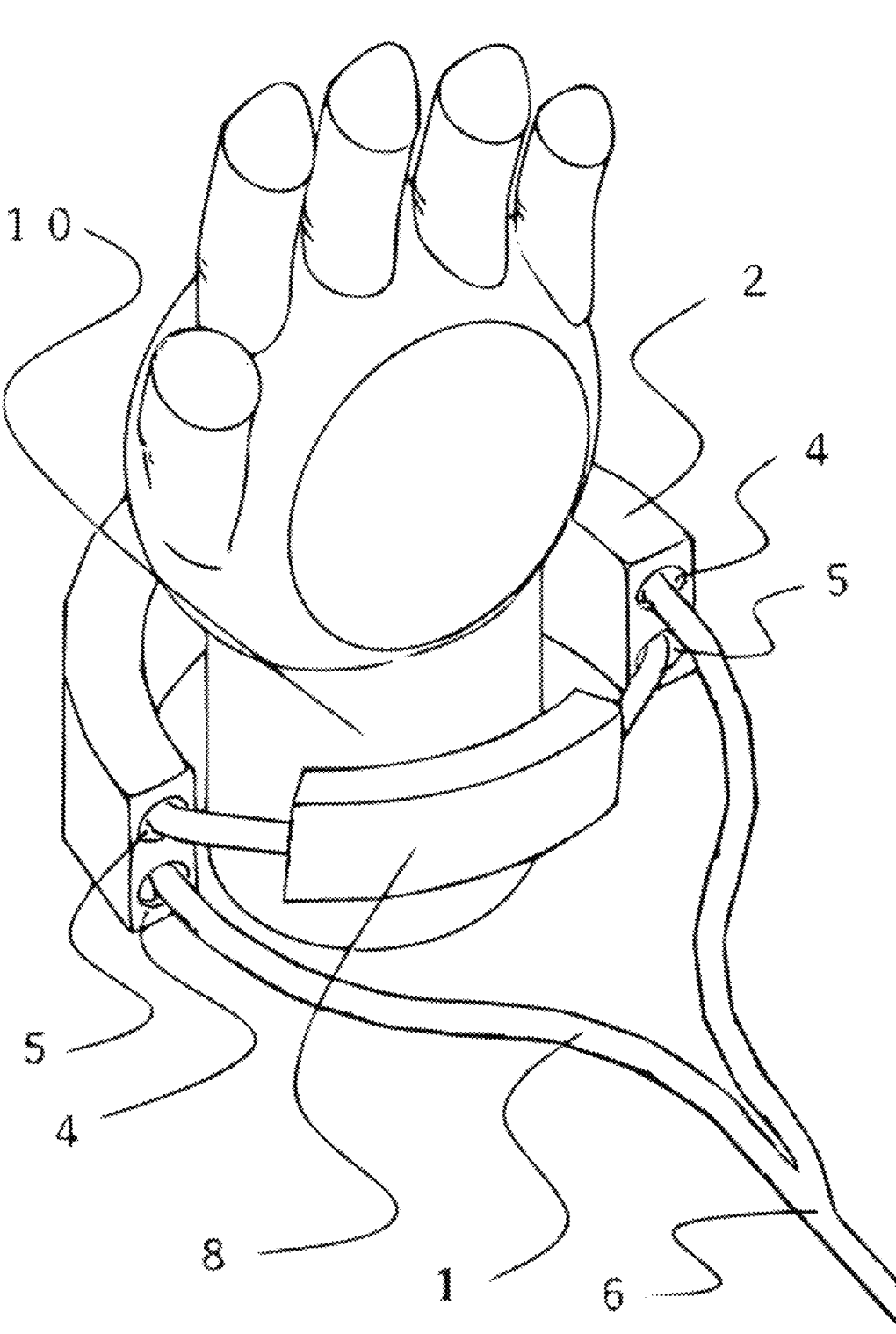
FIG. 18 is the ninth example of cutting the structure (example of adding wrist contact pad).

FIG. 18 shows the example where the wrist contact pad 8 is added to the example shown in FIG. 11. The purpose and the configuration of the wrist contact pad 8 are the same as the explanation of FIG. 5.

Figure 19:
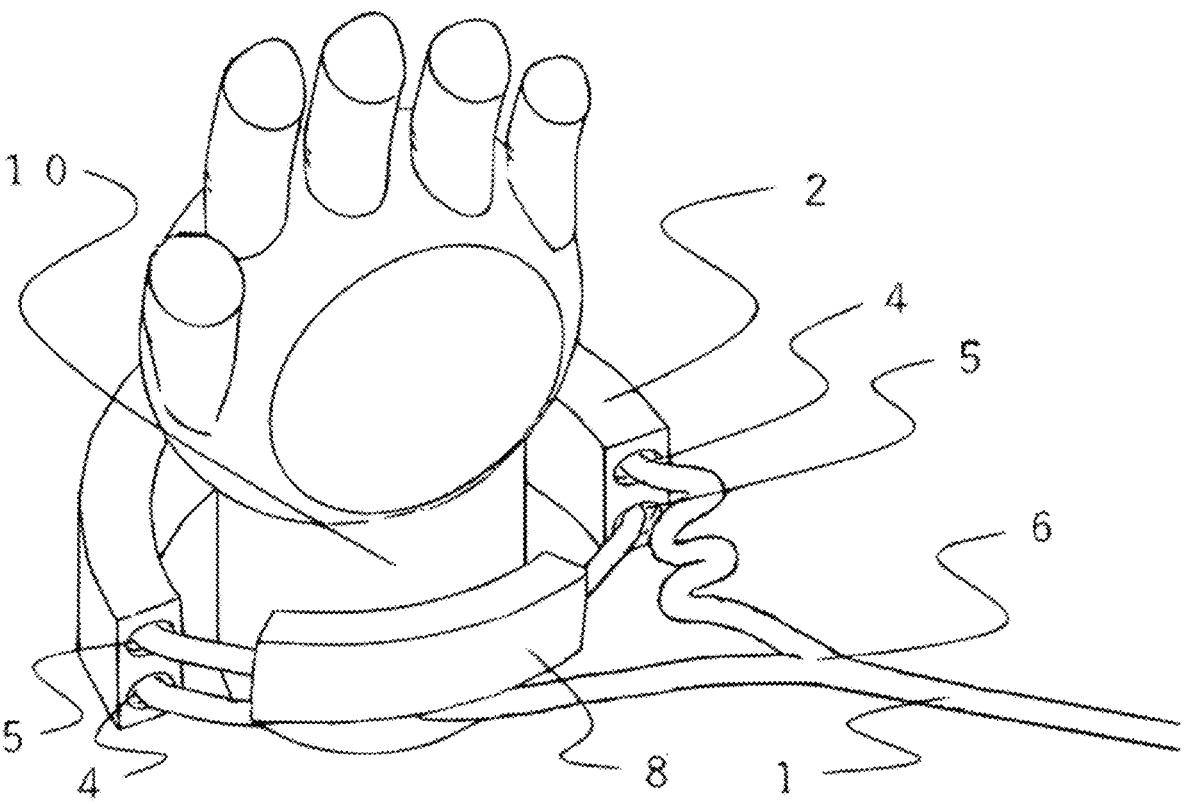
FIG. 19 is the first drawing for explaining the effect of reducing the rotation of the leash.
Figure 20:
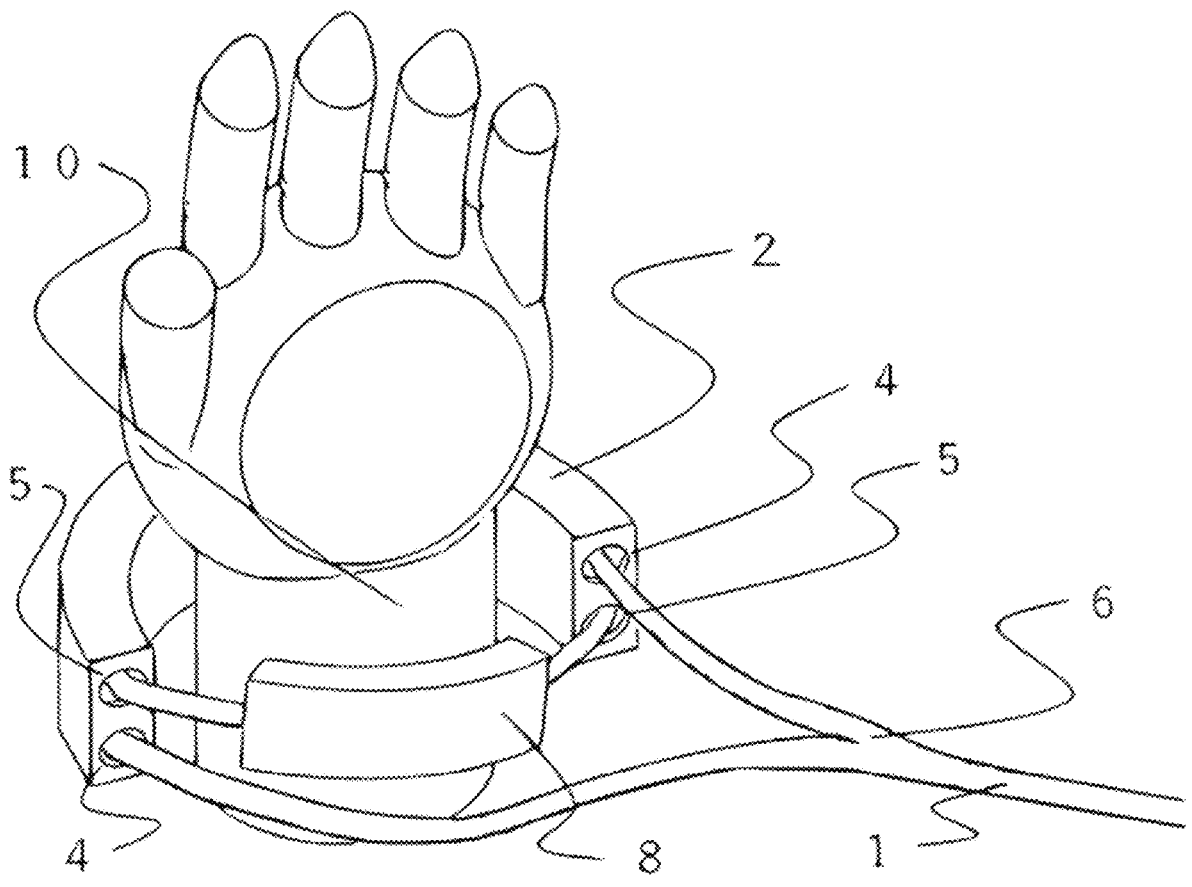
FIG. 20 is the second drawing for explaining the effect of reducing the rotation of the leash.

FIG. 19 and FIG. 20 show the examples where the possibility of the movement of the leash around the wrist while rubbing against the wrist can be reduced compared to the example shown in FIG. 18 when the pet suddenly moves or riots to pull the leash in various directions.

FIG. 19 is a drawing showing a state immediately after the pet pulls the leash obliquely with respect to the opening direction of the opening holes 4 of the both outer end portions of the rope 1 of the structure 2 as an example. At the side where the rope 1 connecting from the opening holes 4 of the both outer end portions of the structure 2 to the joining portion 6 of the rope 1 is separated from the direction of pulling the leash by the pet, the rope 1 is strongly stretched. On the contrary, at the side where the rope 1 is near the direction of pulling the leash by the pet, the rope 1 is loosened. Consequently, the tensile strength of the rope 1 in an unbalanced state.

FIG. 20 is a drawing showing a state that the pet further pulls the leash from the state shown in FIG. 19. The rope 1 inserted into the through hole 7 of the structure 2 has the configuration where the rope 1 can be moved in the through hole 7 with little friction. Thus, the rope 1 moves in the through hole 7 to solve the unbalanced state of the rope 1 in the tensile strength from the opening holes 4 of the both outer end portions of the rope 1 to the joining portion 6 of the rope 1 of the structure 2. By the above described phenomenon, the friction to the wrist 10 hardly occurs and the possibility of the injury of the wrist can be reduced about the structure 2 directly in contact with the wrist 10 and the wrist contact pad 8 not completely fixed to the rope 1. The effect explained in FIG. 19 and FIG. 20 is effective also in the example shown in FIG. 11. However, since the rope 1 is directly in contact with the wrist at the portion without the wrist contact pad 8, the rope 1 is rotated around the wrist 10 while rubbing against the wrist 10 when the rope 1 moved. Thus, the effect is reduced in the example shown in FIG. 11 compared to the example shown in FIG. 18.

Figure 21:
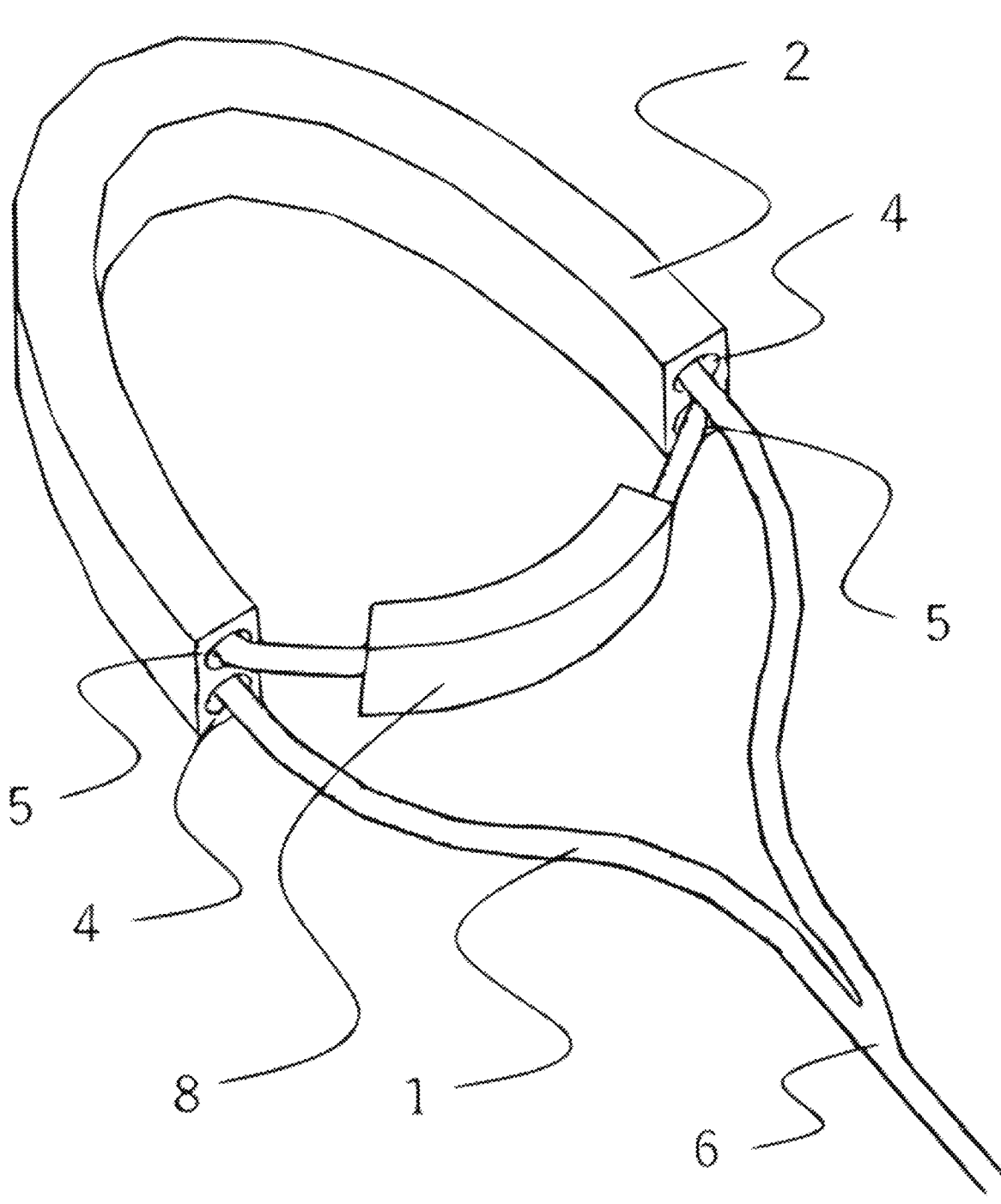
FIG. 21 shows an example of the shape of an inner surface of the structure formed in an ellipse shape.
Figure 22:
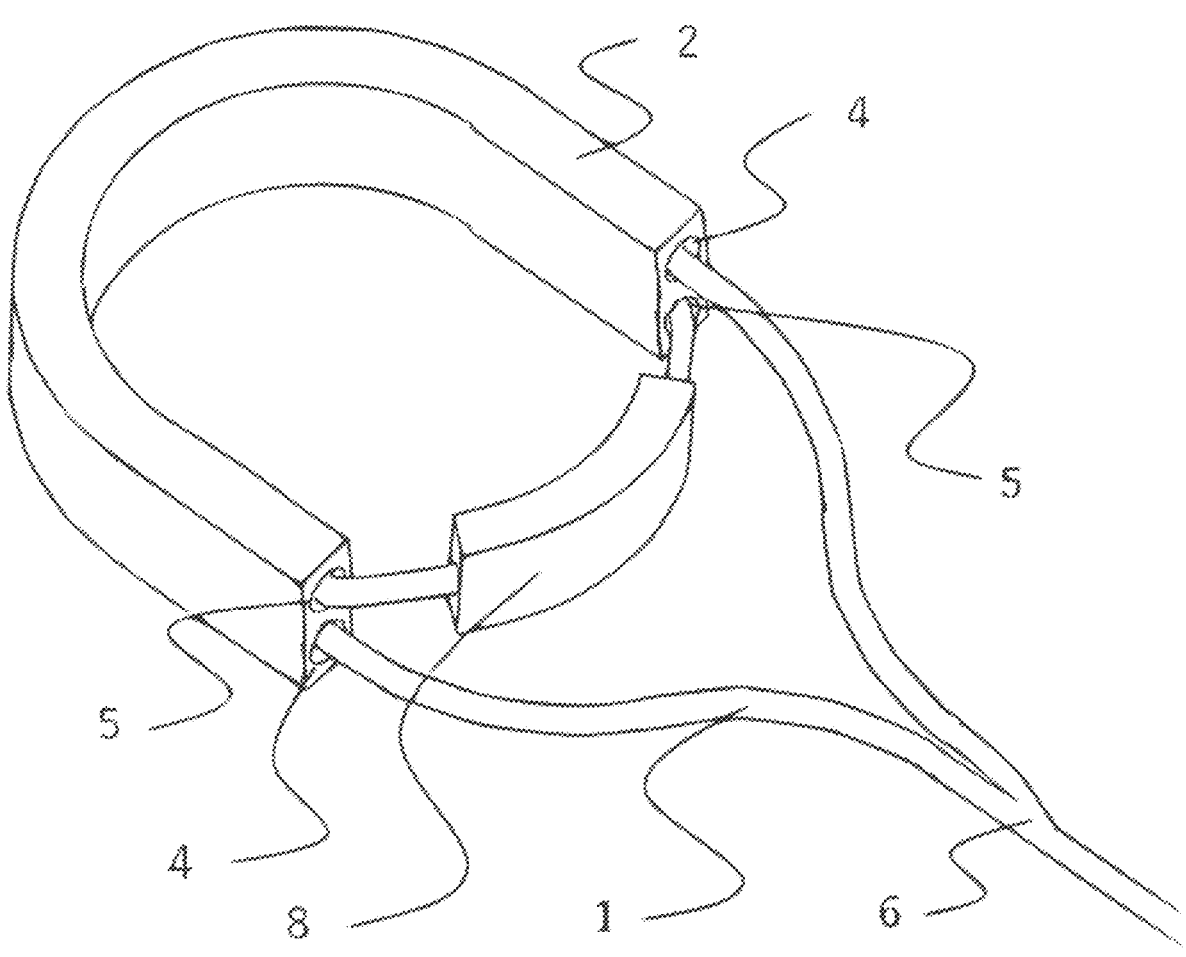
FIG. 22 shows an example of the shape of an inner surface of the structure formed in a long hole shape.

The example of the shape of the structure 2 shown in FIG. 21 is the example where the inner surface of the structure 2 has an ellipse shape based on the example of shape shown in FIG. 18. Consequently, when the wrist 10 is inserted into the ring formed by winding the rope 1 and the rope 1 is tightened to the wrist 10 by pulling the rope 1 toward an end to be connected to the pet, the effect of facilitating to always keep the positional relation of the wrist 10 inserted into the ring with respect to the structure 2 along the ellipse shape can be obtained. In addition, the effect of reducing the possibility of the rotation of the leash from the fixed position during the walking of the pet can be obtained. If the positional relation between the structure 2 and the wrist 10 varies each time when the leash is attached/detached to/from the wrist 10, the position of the rope 1 is not always the same when the owner tries to momentarily grasp the rope 1 by the palm immediately after the pet suddenly riots, for example. Thus, the possibility of taking a time before grasping the rope 1 is increased. On the contrary, if the positional relation is always the same, it is easy to grasp the rope 1 immediately and it is possible to restrict the movement of the pet immediately. FIG. 22 shows the example where the inner surface of the structure has a long hole shape. Even when the shape of the inner surface the structure 2 has a long hole shape, the above described effect can be obtained similar to the elliptic shape. The long hole shape is formed by a part of a circular shape and a straight line as shown in FIG. 22.

Figure 23:
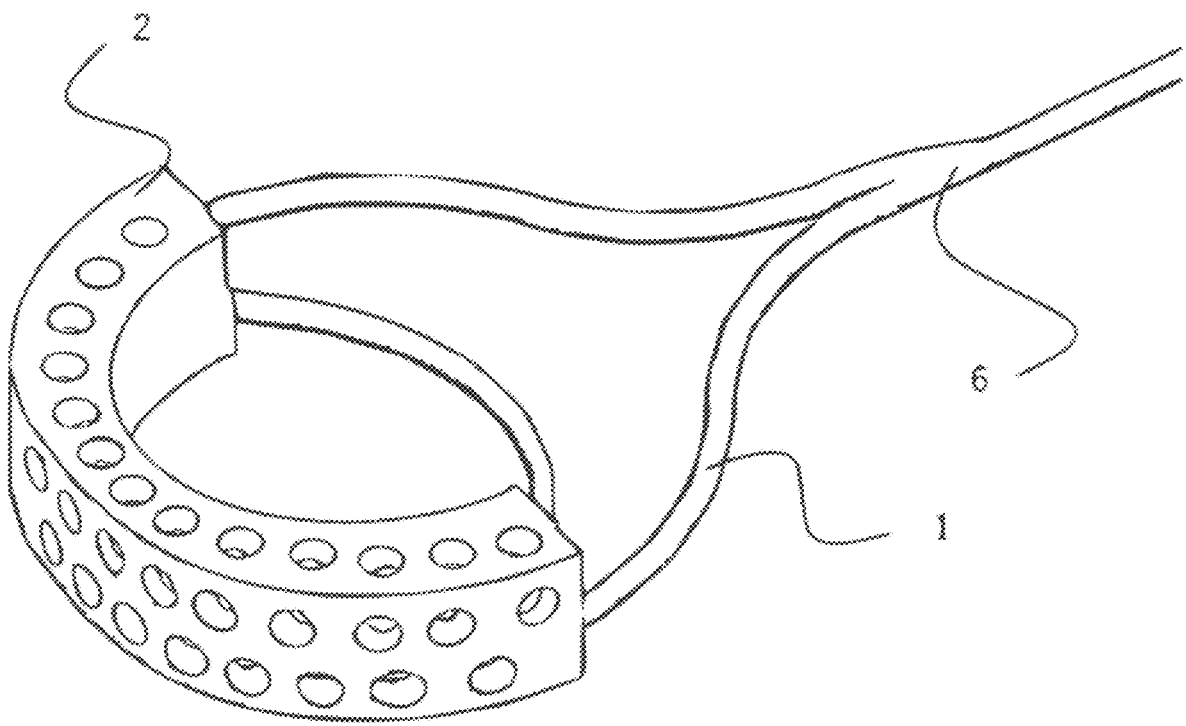
FIG. 23 shows an example of the shape of the structure where the weight of the structure is reduced.

The example of the shape of the structure 2 shown in FIG. 23 is the example where holes having a round shape are formed on the structure 2 of the leash of the present invention for reducing the weight based on the example of the shape shown in FIG. 11. The above described structure achieves the reduction of the weight while the rigidity is secured such a level that the structure 2 is not extremely deformed even when the rope 1 is pulled strongly. Although the round holes having the same size are arranged at approximately equal intervals in the example of the shape, the shape, the size, the position and the number of the holes can be modified variously. Alternatively, it is also effective to partly reduce the thickness of the structure 2 as the method of reducing the weight without forming the holes. Since the weight of the leash itself attached to the wrist is relatively light is reduced by the above described structure, the possibility of the detachment of the leash from the wrist can be reduced even when the hand is moved intensely in some operations during the walking.

Figure 24:
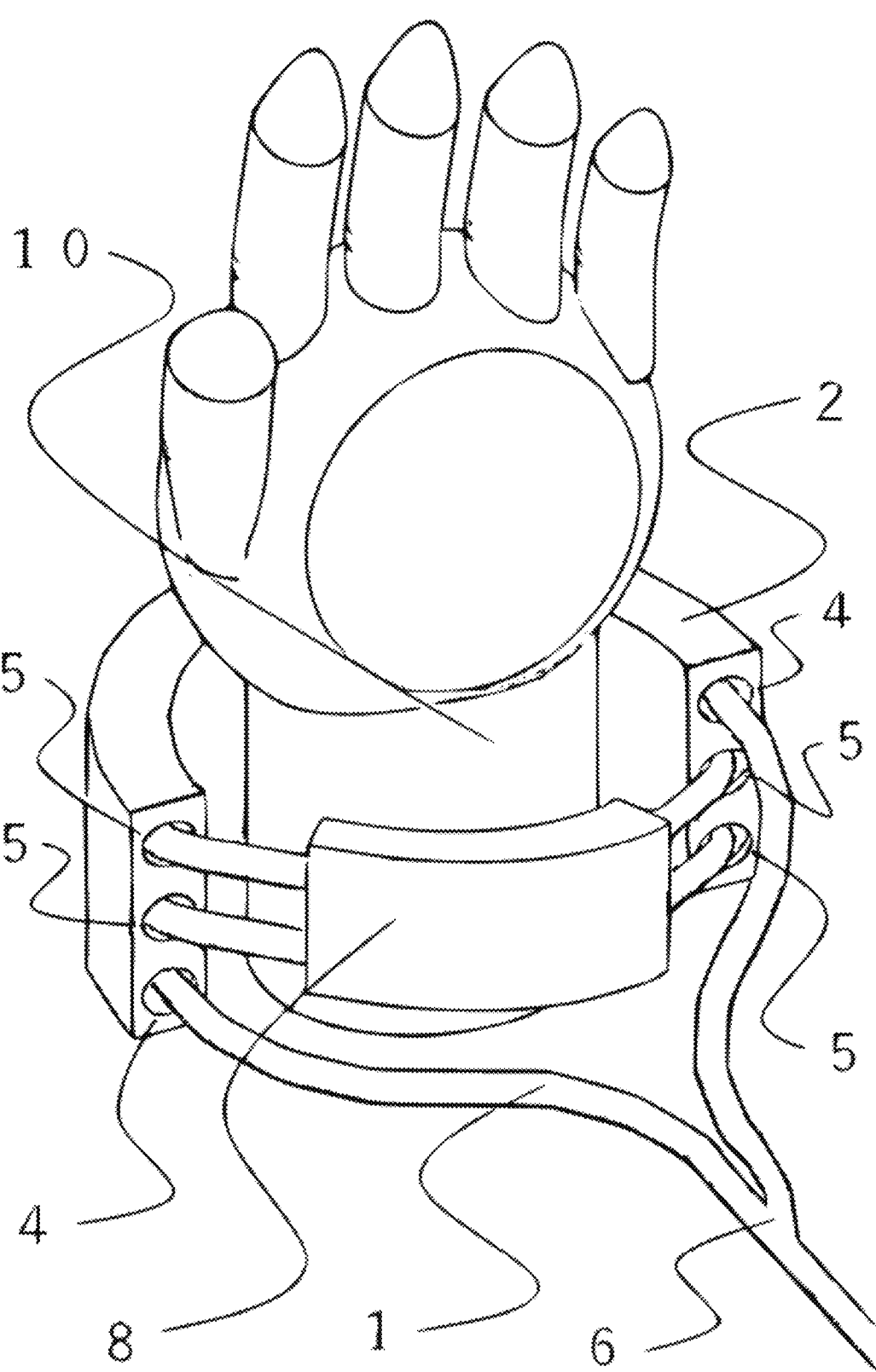
FIG. 24 is a structural drawing of an example where the rope is wound with three turns.

FIG. 24 shows the example where the ring shape is formed by winding the rope 1 with three turns based on the example shown in FIG. 18. Since the number of turning the rope 1 is increased, the number of the rope 1 wound around the wrist 10 is increased. This brings the merit of increasing the feeling of security that the rope 1 is fixed. However, it should be noted that the structure 2 may obstruct various operations since the number of turning the rope 1 is increased and the outer shape of the structure 2 becomes large. Note that the number of turning the rope 1 can be further increased similarly when the ring shape is formed by winding the rope 1 with four or more turns.

DESCRIPTION OF THE REFERENCE
NUMERALS

1: rope; 2: structure; 3: metal hook for connecting pet; 4: opening holes of both outer end portions of rope; 5: opening holes of center portion of rope; 6: joining portion of rope; 7: through hole; 8: wrist contact pad; 9: palm; 10: wrist; 11: opening hole for inserting wrist

The invention claimed is:

1. A leash for a pet used when an owner of the pet walks the pet, the leash comprising:

a rope having a shape of two or more rings at an end to be grasped by the owner; and a structure including a through hole into which one third to a half of a length of one turn of at least one of the two or more rings of the rope is inserted for keeping a part of at least one of the two or more rings, wherein the rope has a portion divided into two, the two or more rings are formed by the portion divided into two, one end to the other end of the two or more rings are continuously connected at the portion divided into two, each of the two or more rings of the rope has the part inserted into the through hole, an inside size of a ring formed by the structure and a freely movable portion of one of the two or more rings of the rope not inserted into the through hole of the structure can be reduced by pulling the rope from another end to be connected to the pet, and the inside size can be enlarged by loosening the rope.

2. The leash for the pet according to claim 1, wherein a maximum size of the inside size of the ring formed by the structure and the freely movable portion of one of the two or more rings of the rope not inserted into the through hole of the structure is a size capable of inserting a fingertip to a wrist of a human into the ring, and a minimum size of the inside size of the ring is smaller than an outer periphery of the wrist.

3. The leash for the pet according to claim 1, wherein the freely movable portion of the rope not inserted into the through hole of the structure is provided at an intermediate portion between both ends of the two or more rings of the rope.

4. The leash for the pet according to claim 3, wherein a member is attached to the two or more rings of the rope at the intermediate portion of the rope where the rope can be moved freely, the member having a cross-sectional shape which cannot be inserted into the through hole of the structure.

5. The leash for the pet according to claim 1, wherein the freely movable portion of one of the two or more rings of the rope not inserted into the through hole of the structure is provided at a center of the both ends of the two or more rings of the rope.

6. The leash for the pet according to claim 1, wherein the structure has a shape surrounding a part of the rope in a circumferential direction of the two or more rings of the rope without surrounding an entire circumference of the two or more rings of the rope.

7. The leash for the pet according to claim 6, wherein an inner shape of the structure corresponding to the two or more rings of the rope is formed by a part of an elliptic shape or the inner shape is formed by a part of a circular shape and a straight line.

*   *   *   *   *